United States Patent
Miyamori et al.

(10) Patent No.: US 10,352,820 B2
(45) Date of Patent: Jul. 16, 2019

(54) DIAGNOSTIC DEVICE, DIAGNOSTIC SYSTEM, DIAGNOSTIC METHOD, AND NON-TRANSITORY COMPUTER-READABLE MEDIUM

(71) Applicant: FUJI XEROX CO., LTD., Tokyo (JP)

(72) Inventors: Shinya Miyamori, Kanagawa (JP); Katsuyuki Kouno, Kanagawa (JP); Atsushi Ito, Kanagawa (JP); Fumihiko Ogasawara, Kanagawa (JP); Tsutomu Udaka, Kanagawa (JP); Tomoyuki Mitsuhashi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 419 days.

(21) Appl. No.: 15/142,527

(22) Filed: Apr. 29, 2016

(65) Prior Publication Data
US 2017/0176286 A1    Jun. 22, 2017

(30) Foreign Application Priority Data

Dec. 16, 2015 (JP) .................................. 2015-245278

(51) Int. Cl.
| | |
|---|---|
| G01C 9/00 | (2006.01) |
| G01C 17/00 | (2006.01) |
| G01C 19/00 | (2013.01) |
| G01M 13/028 | (2019.01) |
| G01C 21/20 | (2006.01) |
| G06K 9/00 | (2006.01) |
| H04N 1/00 | (2006.01) |

(52) U.S. Cl.
CPC ........... *G01M 13/028* (2013.01); *G01C 21/20* (2013.01); *G06K 9/00496* (2013.01); *H04N 1/00015* (2013.01); *H04N 1/00029* (2013.01); *H04N 1/00058* (2013.01)

(58) Field of Classification Search
None
See application file for complete search history.

(56) References Cited

U.S. PATENT DOCUMENTS

| 2007/0070456 | A1 | 3/2007 | Nishimura | |
|---|---|---|---|---|
| 2010/0303248 | A1* | 12/2010 | Tawada | G01H 7/00 381/56 |
| 2012/0250463 | A1* | 10/2012 | Endo | G01S 1/725 367/119 |
| 2013/0201098 | A1* | 8/2013 | Schilit | H04L 12/282 345/156 |
| 2017/0323449 | A1* | 11/2017 | Aonuma | G06T 19/006 |

FOREIGN PATENT DOCUMENTS

| CN | 101142496 A | 3/2008 |
|---|---|---|
| CN | 104048746 A | 9/2014 |
| JP | 2002-5675 A | 1/2002 |
| JP | 2002-044778 A | 2/2002 |
| JP | 2007-079263 A | 3/2007 |
| JP | 2008-289173 A | 11/2008 |
| JP | 2008-290288 A | 12/2008 |
| JP | 2010-281902 A | 12/2010 |

OTHER PUBLICATIONS

Mar. 7, 2016 Office Action issued in Japanese Patent Application No. 2015-245278.
Dec. 17, 2018 Office Action issued in Chinese Patent Application No. 201610511620.0.

* cited by examiner

*Primary Examiner* — Calvin Y Choi
(74) *Attorney, Agent, or Firm* — Oliff PLC

(57) ABSTRACT

A diagnostic device includes an acquisition unit, first and second measurement units, a generation unit, and a guidance unit. The acquisition unit accepts a produced sound as input and acquires sound information. The first measurement unit measures a distance from a standard position. The second measurement unit measures a change in orientation from a standard state. The generation unit generates appropriate position information, the appropriate position information being the distance from the standard position to the diagnostic device measured by the first measurement unit, and the change in orientation from the standard state measured by the second measurement unit. The guidance unit uses the appropriate position information to guide the diagnostic device to an appropriate position when acquiring the sound information.

15 Claims, 25 Drawing Sheets

FIG. 5

| MODEL NAME: ABC001 | | |
|---|---|---|
| WAVEFORM DATA OF FREQUENCY ANALYSIS RESULT | SOUND DATA OF NOISE | CAUSE OF NOISE | TREATMENT |
| WAVEFORM DATA 1 | SOUND DATA 1 | WEAR ON PHOTORECEPTOR DRUM | REPLACE PHOTORECEPTOR DRUM |
| WAVEFORM DATA 2 | SOUND DATA 2 | INSUFFICIENT GREASE IN SHEET TRANSPORT DEVICE | APPLY GREASE |
| ...... | ...... | ...... | ...... |
| WAVEFORM DATA 30 | SOUND DATA 30 | TROUBLE WITH DRIVING MOTOR | REPLACE DRIVING MOTOR |

MODEL NAME: ABC002

MODEL NAME: ABC003

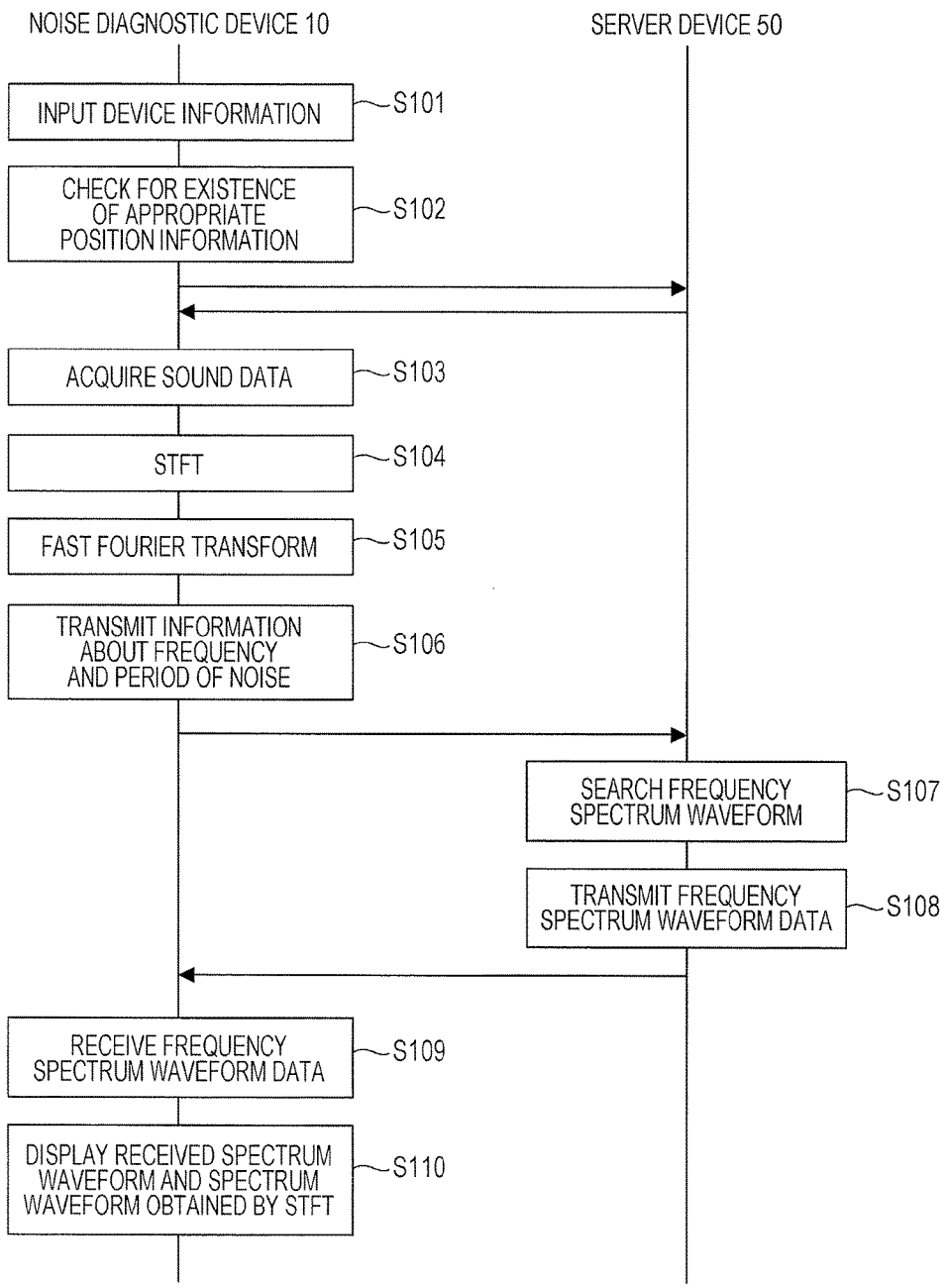

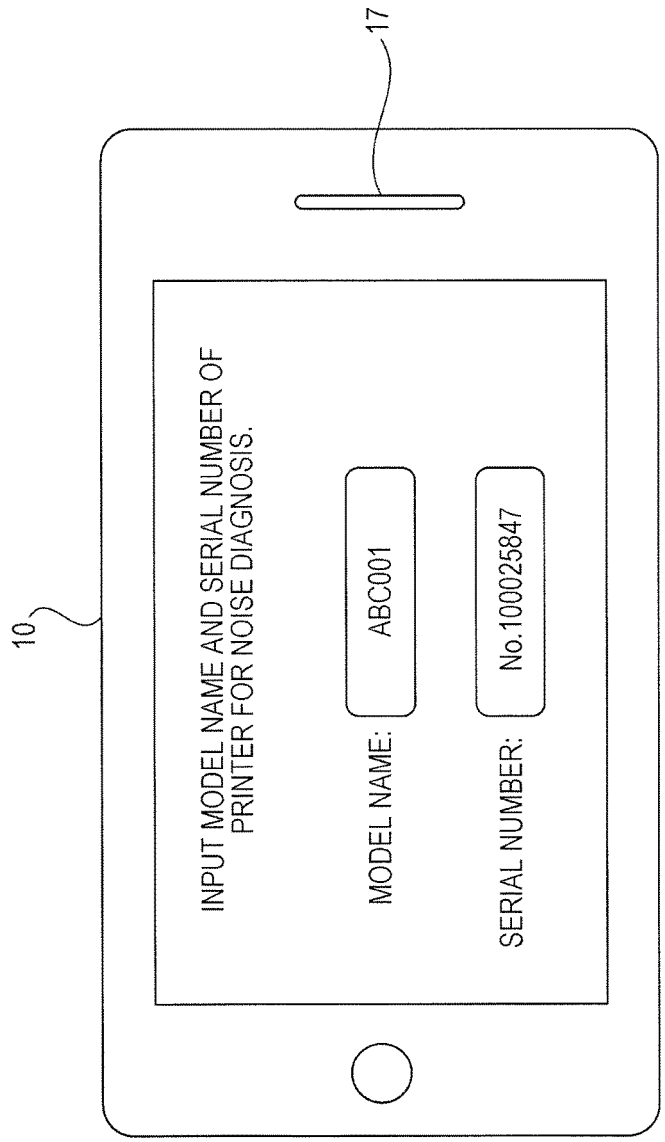

DIAGNOSTIC DEVICE, DIAGNOSTIC SYSTEM, DIAGNOSTIC METHOD, AND NON-TRANSITORY COMPUTER-READABLE MEDIUM

CROSS-REFERENCE TO RELATED APPLICATIONS

This application is based on and claims priority under 35 USC 119 from Japanese Patent Application No. 2015-245278 filed Dec. 16, 2015.

BACKGROUND

Technical Field

The present invention relates to a diagnostic device, a diagnostic system, a diagnostic method, and a non-transitory computer-readable medium.

SUMMARY

According to an aspect of the invention, there is provided a diagnostic device including an acquisition unit, first and second measurement units, a generation unit, and a guidance unit. The acquisition unit accepts a produced sound as input and acquires sound information. The first measurement unit measures a distance from a standard position. The second measurement unit measures a change in orientation from a standard state. The generation unit generates appropriate position information, the appropriate position information being the distance from the standard position to the diagnostic device measured by the first measurement unit, and the change in orientation from the standard state measured by the second measurement unit. The guidance unit uses the appropriate position information to guide the diagnostic device to an appropriate position when acquiring the sound information.

BRIEF DESCRIPTION OF THE DRAWINGS

An exemplary embodiment of the present invention will be described in detail based on the following figures, wherein:

FIG. 5 is a diagram illustrating an example of information stored in the waveform data storage 53 illustrated in FIG. 4;

FIG. 6 is a sequence chart for explaining operation of a noise diagnostic system according to an exemplary embodiment of the present invention;

FIG. 7 is a diagram illustrating an example display screen on the noise diagnostic device 10 when inputting various information such as a model name, a serial number, and an operating status;

DETAILED DESCRIPTION

Next, an exemplary embodiment of the present invention will be described in detail and with reference to the drawings.

Figure 1:
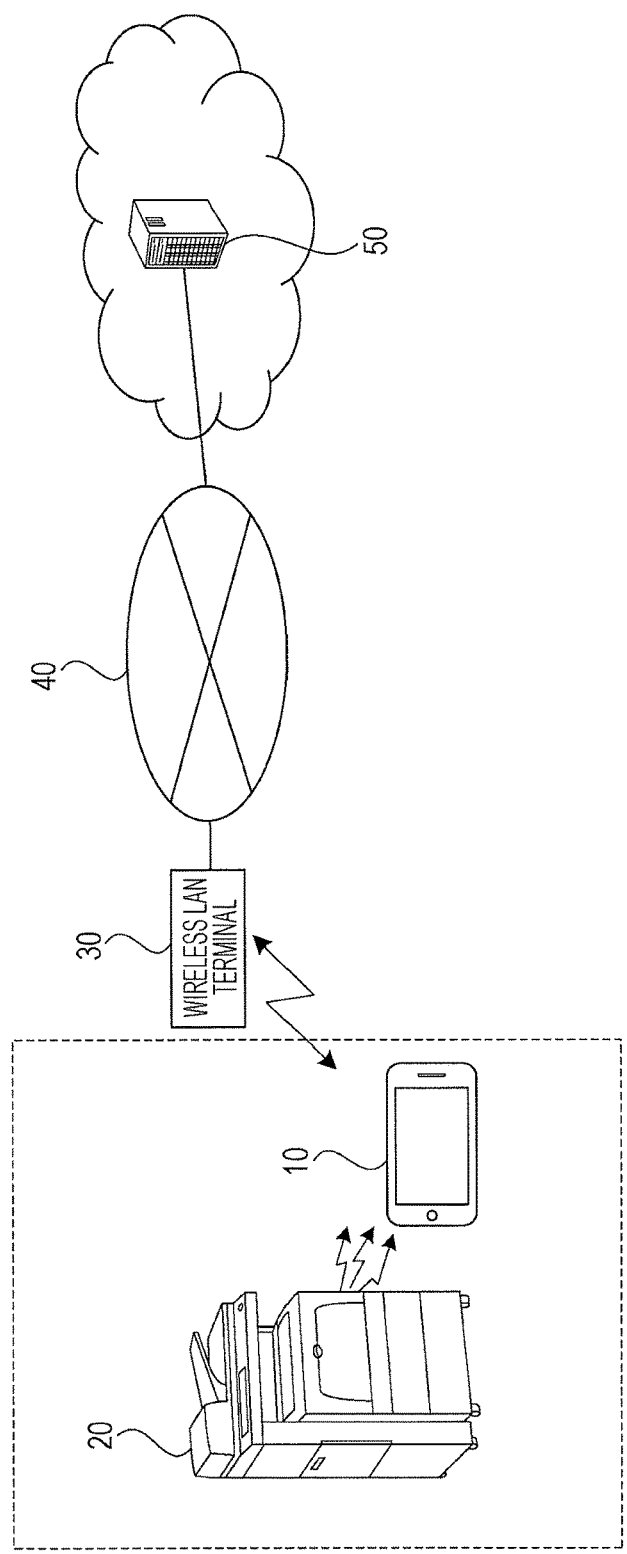
FIG. 1 is a system diagram illustrating a configuration of a noise diagnostic system according to an exemplary embodiment of the present invention.

FIG. 1 is a system diagram illustrating a configuration of a noise diagnostic system according to an exemplary embodiment of the present invention.

As illustrated in FIG. 1, the noise diagnostic system according to an exemplary embodiment of the present invention is made up of a mobile noise diagnostic device 10, such as a personal computer, a smartphone, or a tablet, and a server device 50.

Note that the present invention is still applicable insofar as the noise diagnostic device 10 is a device able to connect to the server device 50 over a communication network. However, the present exemplary embodiment will be described using a case in which the noise diagnostic device 10 is a tablet equipped with a device such as a microphone able to acquire a sound signal, and also allowing touch input.

The noise diagnostic device 10 is carried by a serviceman (maintenance personnel) who maintains, manages, and repairs an image forming device 20, such as a printer used by end users. The noise diagnostic device 10 is used to acquire a noise (abnormal sound) signal produced in the image forming device 20, perform frequency analysis of the acquired noise signal, and display a frequency analysis result waveform of previous noise signals acquired from the server device 50 and a frequency analysis result waveform of the acquired noise signal.

The noise diagnostic device 10 and the server device 50 are connected to each other and exchange information via a wireless LAN terminal 30, such as a Wi-Fi router, and an Internet communication network 40.

Note that when the noise diagnostic device 10 is a device such as a mobile phone or a smartphone, the noise diagnostic device 10 and the server device 50 may also connect to each other and exchange frequency analysis result waveform data via a mobile phone network.

In the noise diagnostic system according to the present exemplary embodiment, when a noise is produced in a certain image forming device 20 that acts as a target electronic device installed in an end user location, a serviceman carrying the noise diagnostic device 10 is dispatched to the location of the image forming device 20. Subsequently, the serviceman acquires a noise signal by using the noise diagnostic device 10 to record the noise being produced, and performs a noise diagnosis that identifies the cause of the noise.

Note that it is also technically possible to equip the image forming device 20 with a sound-recording function by providing a microphone or the like and cause the image forming device 20 to record noise using this sound-recording function when noise is produced, but when the image forming device 20 is installed in a location such as an end user office, providing the image forming device 20 with a function of recording sound may be undesirable for security reasons.

Figure 2:
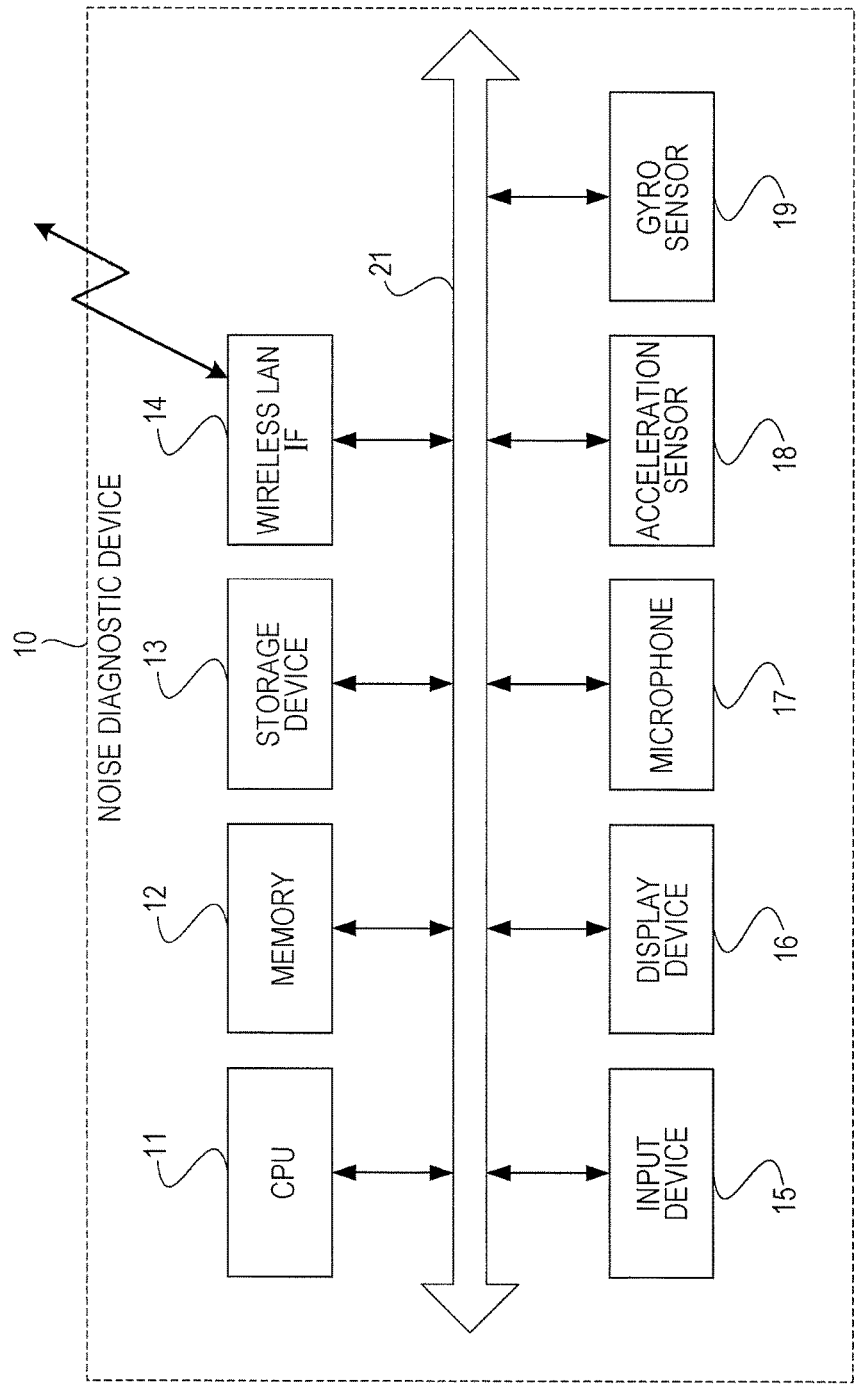
FIG. 2 is a block diagram illustrating a hardware configuration of a noise diagnostic device 10 according to an exemplary embodiment of the present invention.

Next, FIG. 2 illustrates a hardware configuration of the noise diagnostic device 10 in a noise diagnostic system according to the present exemplary embodiment.

As illustrated in FIG. 2, the noise diagnostic device 10 includes a CPU 11, memory 12 capable of saving data temporarily, a storage device 13 such as flash memory, a wireless LAN interface (IF) 14 that performs wireless communication to transmit and receive data to and from the wireless LAN terminal 30, an input device 15 such as a touch sensor, a display device 16, a microphone 17, an acceleration sensor 18, and a gyro sensor (angular velocity sensor) 19. These structural elements are connected to each other by a control bus 21.

The noise diagnostic device 10 according to the present exemplary embodiment is equipped with a touch panel in which a touch sensor for detecting a touch position on the display device 16 is provided as the input device 15, and this touch panel is used to present a display while also accepting input from a user.

The CPU 11 controls the operation of the noise diagnostic device 10 by executing designated processes on the basis of a control program stored in the memory 12 or the storage device 13. Note that the control program may also be acquired and provided to the CPU 11 by being downloaded via the Internet communication network 40 or a mobile phone network, or be provided to the CPU 11 by storing such a program on a storage medium such as CD-ROM.

As a result of the above control program being executed, the noise diagnostic device 10 according to the present exemplary embodiment performs operations like those described hereinafter, and assists the serviceman in the work of identifying the cause of noise.

Figure 3:
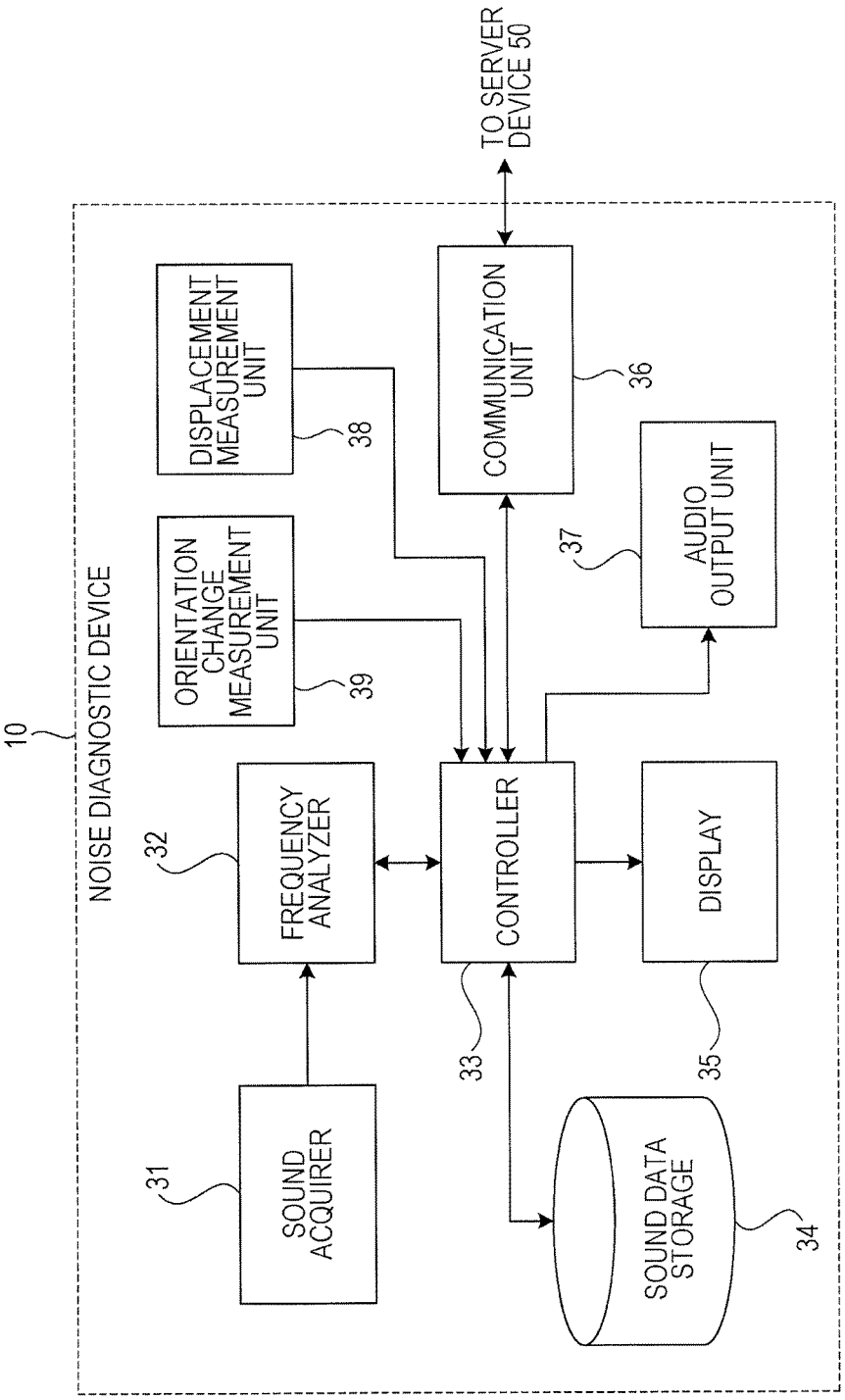
FIG. 3 is a block diagram illustrating a functional configuration of a noise diagnostic device 10 according to an exemplary embodiment of the present invention.

FIG. 3 is a block diagram illustrating a functional configuration of the noise diagnostic device 10 realized as a result of the above control program being executed.

As illustrated in FIG. 3, the noise diagnostic device 10 according to the present exemplary embodiment is equipped with a sound acquirer 31, a frequency analyzer 32, a controller 33, sound data storage 34, a display 35, a communication unit 36, an audio output unit 37, a displacement measurement unit 38, and an orientation change measurement unit 39.

The display unit 35 presents a display of various data on the basis of control by the controller 33. The communication unit 36 communicates with an external device, namely the server device 50.

The sound acquirer 31 acquires a sound signal by accepting the input of noise produced by a device to be analyzed, namely the image forming device 20.

Note that although the present exemplary embodiment describes the sound acquirer 31 as acquiring a sound signal by accepting the input of noise produced in the image forming device 20, this sound signal is an example of sound information.

The frequency analyzer 32 performs time-frequency analysis (time-dependent frequency analysis) on the sound signal acquired by the sound acquirer 31, and generates frequency spectrum waveform (frequency analysis result waveform) data expressing the change over time in the signal intensity distribution at each frequency of the acquired noise signal.

Specifically, the frequency analyzer 32 generates frequency spectrum waveform data by applying the short-time Fourier transform (STFT) to the sound signal acquired by the sound acquirer 31. The STFT will be described later.

The controller 33 stores the frequency spectrum waveform data obtained by the frequency analyzer 32 together with the sound data in the sound data storage 34. Subsequently, the controller 33 performs control to display the frequency spectrum waveform data obtained by the STFT result on the display unit 35 that acts as a touch panel.

After that, if the user performs a touch operation on the frequency spectrum waveform data displayed on the display 35, such as an operation of using a finger to trace a region estimated to be noise signal components, the controller 33 receives a specification of a region including noise signal components in the displayed frequency spectrum waveform data, on the basis of the user's touch operation.

Subsequently, the controller 33 instructs the frequency analyzer 32 to execute a fast Fourier transform that performs frequency analysis in the time axis direction (1D-FFT) on the frequency components in the region specified as the region including noise signal components from the frequency spectrum waveform data obtained by the frequency analyzer 32. Consequently, the frequency analyzer 32 performs the fast Fourier transform in the time axis direction on the frequency components included in the designated region.

Subsequently, the controller 33 extracts information about the period and the frequency of noise from the analysis result of the fast Fourier transform by the frequency analyzer 32.

Note that the signal components of ordinary operating sounds are also included in the region of low frequency less than or equal to a preset frequency, even when noise is not produced. For this reason, the controller 33 may also be configured to not accept a specification in the region less than or equal to the preset frequency, even when such a region is specified as the region including noise signal components.

In addition, the controller 33 transmits the information about the period and the frequency of the acquired noise, together with model information such as the model name and the serial number of the image forming device 20 and operating status information indicating the operating status of the image forming device 20, to the server device 50 via the communication unit 36. Specifically, the operating status information may be configured to include information indicating color printing or monochrome printing, information indicating double-sided printing or single-sided printing, information indicating whether the operating mode is scan, print, or copy, and information such as the type of paper used. In this way, the controller 33 transmits information obtained from the frequency spectrum waveform data obtained by the frequency analyzer 32 to the server device 50 via the communication unit 36.

In the server device 50, spectrum waveform data obtained by performing frequency analysis on sound signals of noise produced in the past by devices similar to the image forming device 20 is stored together with the original sound data and information such as the operating status of the device, cause of noise, and treatment for the noise when that sound data was acquired.

Subsequently, from the information about the period and the frequency of the noise transmitted from the noise diagnostic device 10, the server device 50 searches for frequency spectrum waveform data corresponding to the frequency spectrum waveform data obtained as a result of frequency analysis by the frequency analyzer 32, and transmits found frequency spectrum waveform data, together with information such as sound data stored as noise sample waveform data, to the noise diagnostic device 10.

As a result, the controller 33 receives, from the server device 50 via the communication unit 36, frequency spectrum waveform data corresponding to the frequency spectrum waveform data obtained as a result of the frequency analysis by the frequency analyzer 32.

The controller 33 controls the display 35 to display the frequency spectrum waveform data obtained by performing frequency analysis on the sound signal acquired by the sound acquirer 31, in parallel with the spectrum waveform received from the server device 50.

Note that if there are multiple sets of frequency spectrum waveform data transmitted from the server device 50, the controller 33 gives priority to the one among the multiple sets of frequency spectrum waveform data having the highest similarity to the frequency spectrum waveform data obtained by frequency analysis by the frequency analyzer 32 for display on the display 35.

The displacement measurement unit 38 measures the distance from a standard position of the noise diagnostic device 10 by taking the double integral of acceleration information, which is detection information obtained by the acceleration sensor 18. In other words, velocity information is obtained by integrating the acceleration information from the acceleration sensor 18, and this velocity information is integrated further to compute the displacement.

Also, the orientation change measurement unit 39 measures the change in orientation from a standard state of the noise diagnostic device 10 by integrating angular velocity information, which is detection information obtained by the gyro sensor 19.

Note that the present exemplary embodiment describes using the gyro sensor 19 to measure the change in orientation, but a geomagnetic sensor may also be used instead of the gyro sensor 19 to measure the change in orientation from the standard state of the noise diagnostic device 10.

The controller 33 generates appropriate position information, which is a distance from a standard position to the noise diagnostic device 10 and a change in orientation from a standard state, as measured by the displacement measurement unit 38 and the orientation change measurement unit 39. Specifically, the controller 33, after giving an instruction to place the noise diagnostic device 10 in the standard state at the standard position with respect to the target device, generates appropriate position information by using the displacement measurement unit 38 and the orientation change measurement unit 39 to compute the displacement and the change in orientation of the noise diagnostic device 10 to reach an appropriate position at which the sound signal to be acquired by the sound acquirer 31 reaches a magnitude suitable for acquisition.

Specifically, a sound output from the device to be analyzed, namely the image forming device 20, is treated as a standard sound, the position at which this standard sound has a sufficiently large signal level when acquired by the sound acquirer 31, or at which the acquired sound signal is clear, is treated as the appropriate position, and the displacement and change in orientation from an initially set standard position and standard state is treated as the appropriate position information.

At this point, since the microphone or the like that accepts the input of signal sounds is directional, the position at which the directionality of the microphone 17 of the noise diagnostic device 10 and the position of the sound source are aligned becomes the appropriate position.

In addition, when the signal level of the standard sound is not very high, the position where the acquired signal sound reaches a maximum may be treated as the appropriate position, but if the signal sound is too large, the processable volume range may be exceeded, and the normal frequency analysis may become difficult. For this reason, the position where the signal level of the acquired signal sound is contained within the processable volume range becomes the appropriate position.

Consequently, one example of a method of setting the appropriate position is a method that sets, as the appropriate position, the position where the signal level of the acquired standard sound lies within a predetermined range. In other words, the appropriate position information is information related to the position where the magnitude of the sound lies within a predetermined range when acquiring sound information with the sound acquirer 31.

Herein, sound used as the standard sound may be a normal operating sound, such as the sound of a fan motor of the image forming device 20, or a sound of fixed volume output from a speaker of the image forming device 20. Additionally, the image forming device 20 may be configured to output a beep sound or the like, and the sound that is output may be treated as the standard sound. Furthermore, a sound may be output from another device such as a smartphone, the other device outputting the sound may be placed in a certain location on the image forming device 20, and the sound being output from the other device may be treated as the standard sound.

In addition, when attempting to acquire a sound signal with the sound acquirer 31, the controller 33 checks whether or not already-generated appropriate position information is stored in the server device 50. Subsequently, if already-generated appropriate position information is stored in the server device 50, the controller 33 uses the appropriate position information when acquiring the sound signal to guide the noise diagnostic device 10 to the appropriate position. Specifically, the controller 33, after giving an instruction to place the noise diagnostic device 10 in the standard state at the standard position with respect to the device to be analyzed, namely the image forming device 20, uses the already-generated appropriate position information, the displacement measured by the displacement measurement unit 38, and the change in orientation measured by the orientation change measurement unit 39 to guide the noise diagnostic device 10 to the appropriate position.

Herein, the standard position on the image forming device 20 refers to a predetermined position, such as a center position on the front face of the image forming device 20, or a position that acts as a guiding mark, for example. Also, the standard state refers to a state in which the upper edge of the noise diagnostic device 10 configured as a tablet with the display screen facing up is directed towards the image forming device 20, for example.

Subsequently, after the controller 33 guides the noise diagnostic device 10 to the appropriate position by instructing the user to move the noise diagnostic device 10 to the appropriate position, the controller 33 gives an instruction to acquire the sound signal with the sound acquirer 31.

At this point, the sound acquirer 31 may also be configured to not start the acquisition of the sound signal until the controller 33 finishes guiding the noise diagnostic device 10 to the appropriate position.

In addition, the controller 33 may be configured to guide the noise diagnostic device 10 to the appropriate position by causing the display 35 to display guidance for leading the noise diagnostic device 10 to the appropriate position, or guide the noise diagnostic device 10 to the appropriate position by causing the audio output unit 37 to output audio guidance for leading the noise diagnostic device 10 to the appropriate position.

Furthermore, the controller 33 may also be configured to vary the content of the displayed guidance according to the distance from the current position of the noise diagnostic device 10 to the appropriate position.

In addition, the controller 33 may also be configured to guide the noise diagnostic device 10 to the appropriate position by displaying an exterior view of the noise diagnostic device 10 and indicating a direction in which to change orientation.

Next, a functional configuration of the server device 50 in a noise diagnostic system according to the present exemplary embodiment will be described with reference to the block diagram in FIG. 4.

Figure 4:
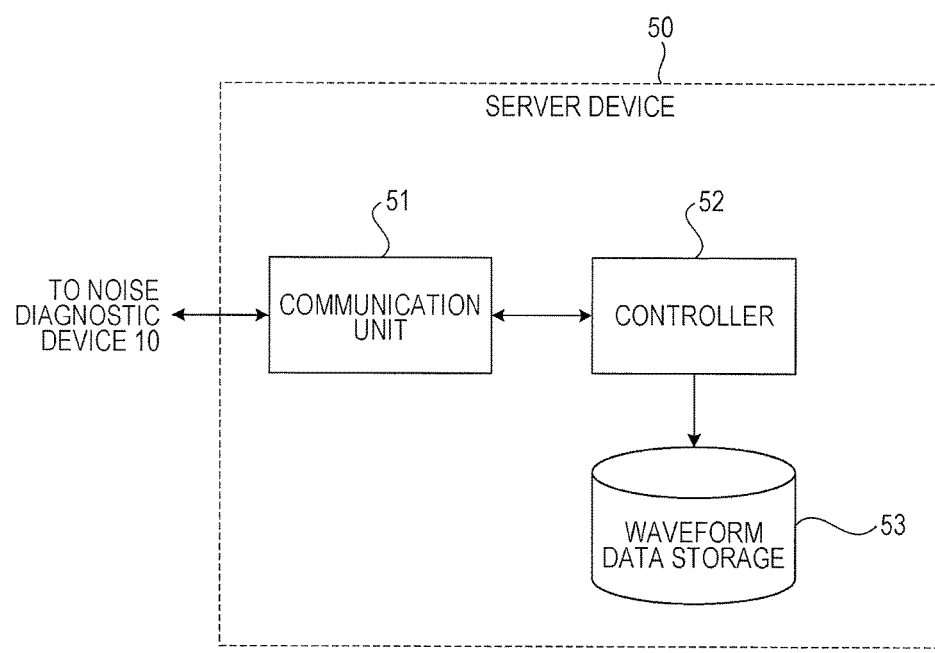
FIG. 4 is a block diagram illustrating a functional configuration of a server device 50 according to an exemplary embodiment of the present invention.

As illustrated in FIG. 4, the server device 50 according to the present exemplary embodiment is equipped with a communication unit 51, a controller 52, and waveform data storage 53.

The waveform data storage 53 stores multiple sets of frequency spectrum waveform data obtained by performing frequency analysis on sound signals of noise produced in the past by devices similar to the device to be analyzed, namely the image forming device 20.

Specifically, as illustrated in FIG. 5, the waveform data storage 53 stores, for each model, information such as frequency spectrum waveform data obtained by performing a time-frequency analysis on the sound data of previously acquired noise, the original sound data, the cause of the noise, and the treatment to address the noise.

Subsequently, in the case of receiving information about the period and the frequency of noise from the noise diagnostic device 10, the controller 52 selects waveform data similar to frequency spectrum waveform data based on the noise acquired in the noise diagnostic device 10 from among the multiple sets of frequency spectrum waveform data stored in the waveform data storage 53, on the basis of the received information about the period and the frequency of the noise, and transmits the selected waveform data to the noise diagnostic device 10 via the communication unit 51.

Next, the operation of the noise diagnostic system according to the present exemplary embodiment will be described with reference to the sequence chart in FIG. 6.

In the case of using the noise diagnostic device 10 to perform a noise diagnosis for identifying the cause of noise, an image like that illustrated in FIG. 7 is displayed, and various information such as the model name, serial number, and operating status is input (step S101).

Next, the noise diagnostic device 10 accesses the server device 50, and checks whether or not appropriate position information corresponding to the model of the noise diagnostic device 10 is stored (step S102). Note that if appropriate position information is stored not for each model of the noise diagnostic device, but instead for each combination of the model of the noise diagnostic device and the model of the device to be analyzed, the noise diagnostic device 10 checks whether or not appropriate position information for the combination of the model of the noise diagnostic device 10 and the model of the image forming device 20 is stored.

Subsequently, if appropriate position information exists, the noise diagnostic device 10 uses the appropriate position information to guide and instruct the user to move the noise diagnostic device 10 to the appropriate recording position (appropriate position), and after that, switches the operating mode to an audio recording mode and records noise to acquire sound data (step S103). On the other hand, if appropriate position information does not exist, the noise diagnostic device 10 generates appropriate position information, stores the appropriate position information in the server device 50, and also records noise to acquire sound data.

Figure 8:
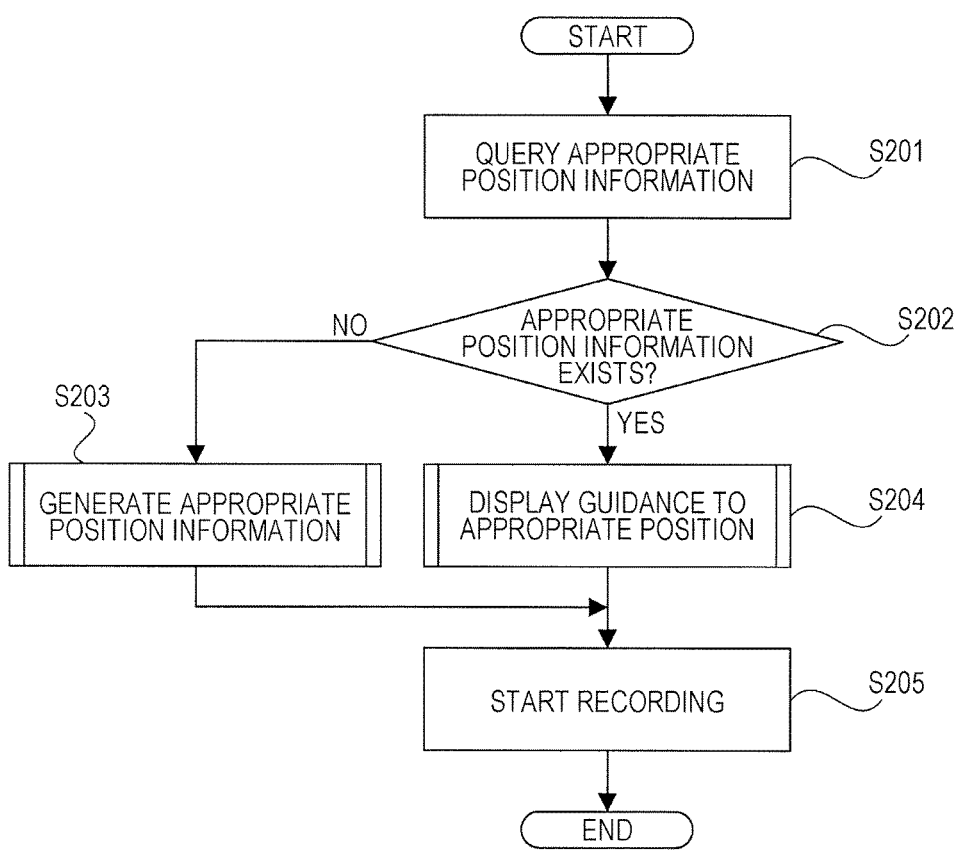
FIG. 8 is a flowchart for explaining details of operation in steps S102 and S103 of FIG. 6.

The operation in steps S102 and S103 will be described in detail with reference to the flowchart in FIG. 8.

First, in the noise diagnostic device 10, the controller 33 transmits model information about the noise diagnostic device 10 and model information about the image forming device 20 to be analyzed to the server device 50 via the communication unit 36, and queries whether or not appropriate position information for the combination is registered (step S201). At this point, if corresponding appropriate position information is not registered in the server device 50 (step S202, no), the noise diagnostic device 10 generates appropriate position information (step S203), and after that, starts recording noise (step S205).

On the other hand, if corresponding appropriate position information is registered in the server device 50 (step S202, yes), the noise diagnostic device 10 acquires the appropriate position information from the server device 50, uses the appropriate position information to display guidance for moving the noise diagnostic device 10 to the appropriate position (step S204), and after that, starts recording noise (step S205).

Figure 9:
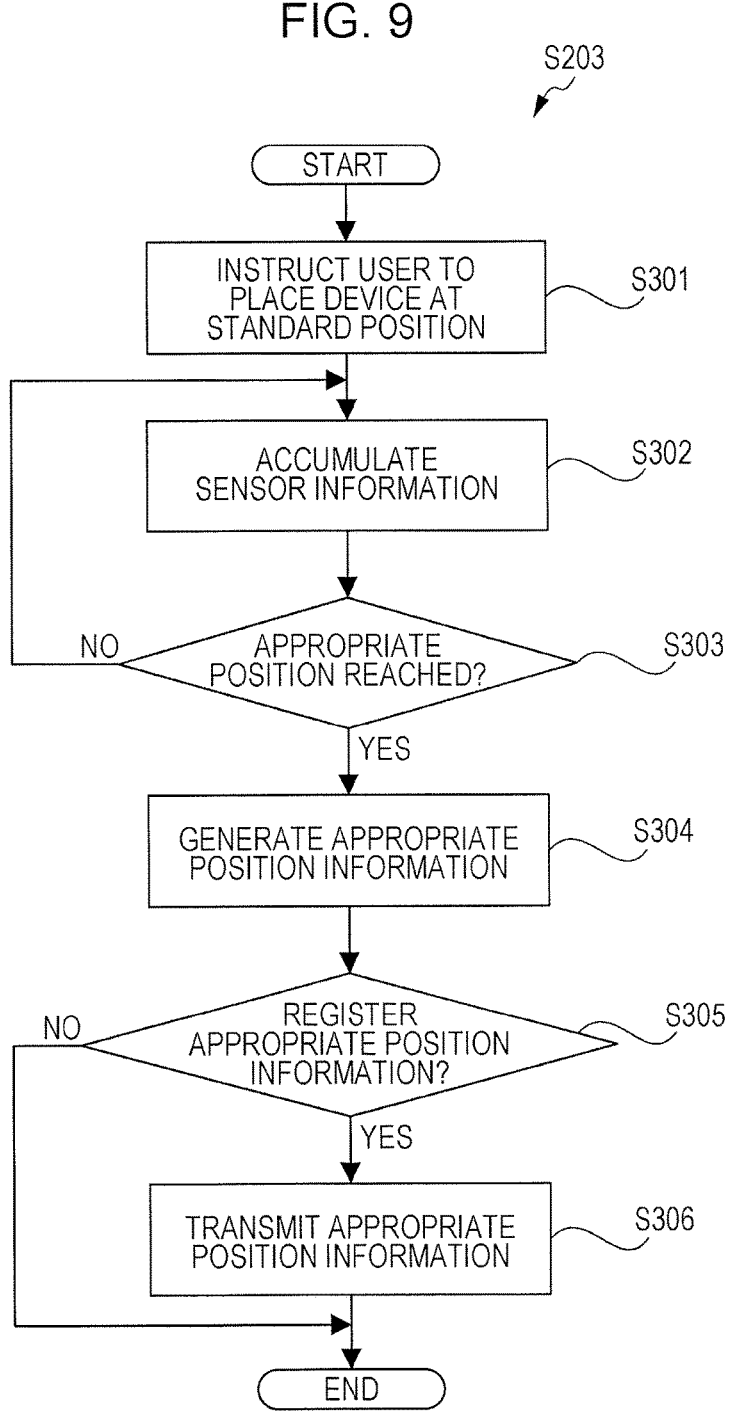
FIG. 9 is a flowchart for explaining details of an appropriate position information generation process (step S203) illustrated in the flowchart of FIG. 8.

Next, the appropriate position information generation process (step S203) illustrated in the flowchart of FIG. 8 will be described in detail with reference to the flowchart in FIG. 9.

Figure 10:
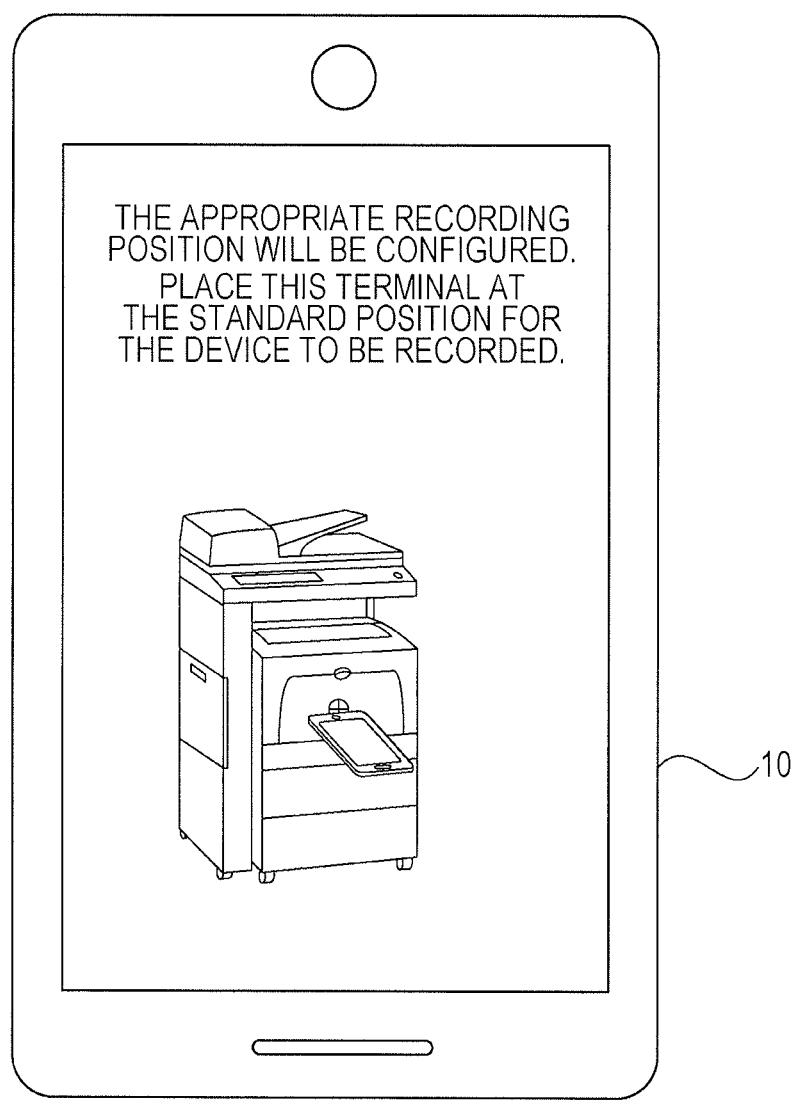
FIG. 10 is an example display screen in a case of instructing a user to place a noise diagnostic device 10 in a standard state at a standard position of an image forming device 20.

First, the controller 33 of the noise diagnostic device 10 presents a display like that illustrated in FIG. 10, for example, and thereby instructs the user to place the noise diagnostic device 10 in the standard state at the standard position of the image forming device 20 (step S301). Herein, the standard position is near the center on the front face of the noise diagnostic device 10, and the standard state is a state in which the display screen of the noise diagnostic device 10 is facing upwards in the vertical direction.

Subsequently, if the user operates the noise diagnostic device 10 to produce the standard sound and moves the noise diagnostic device 10 in a direction moving away from the image forming device 20, the displacement measurement unit 38 and the orientation change measurement unit 39 accumulate sensor information from the acceleration sensor 18 and the gyro sensor 19, respectively (step S302).

Subsequently, the controller 33, by monitoring the signal level of the signal sound acquired by the sound acquirer 31, determines whether or not the noise diagnostic device 10 has reached the appropriate position (step S303). At this point, the accumulation of sensor information in step S302 is executed until the controller 33 determines that the noise diagnostic device 10 has reached the appropriate position in step S303.

Upon determining in step S303 that the noise diagnostic device 10 has reached the appropriate position, the controller 33 generates appropriate position information on the basis of the sensor information accumulated up to that point (step S304).

FIG. 11 will be referenced to describe how appropriate position information is generated in this way.

Figure 11A:
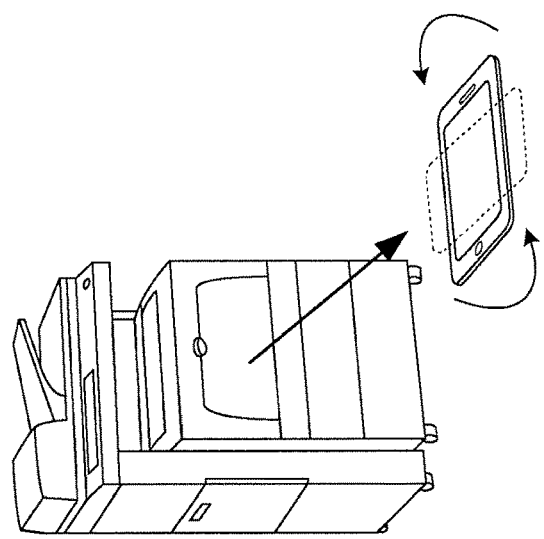
FIGS. 11A to 11C are a diagram for explaining how appropriate position information is generated.

First, FIG. 11A illustrates how the user, by being instructed as illustrated in FIG. 10, places the noise diagnostic device 10 at the standard position of the image forming device 20.

Figure 11B:
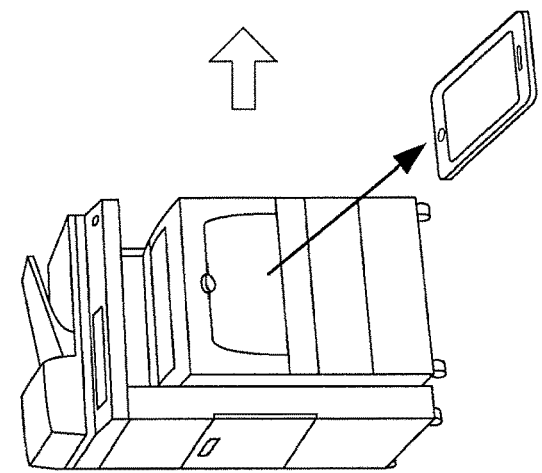

Additionally, FIG. 11B illustrates how the noise diagnostic device 10 is moved in a direction away from the image forming device 20 while in a state of monitoring the signal level of the standard sound.

Figure 11C:
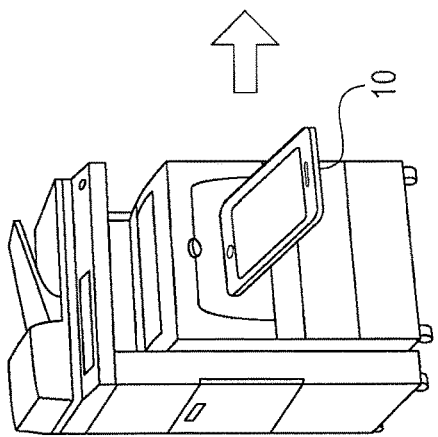

Additionally, FIG. 11C illustrates how the noise diagnostic device 10 additionally is rotated to change orientation with respect to the image forming device 20. Note that although FIG. 11C illustrates the case of rotating the noise diagnostic device 10 in the horizontal direction, the noise diagnostic device 10 may also be rotated in the vertical direction.

The appropriate position is decided by performing operations as illustrated in FIGS. 11A to 11C, and the displacement from the standard position and the change in orientation from the standard state are created as appropriate position information.

Figure 12:
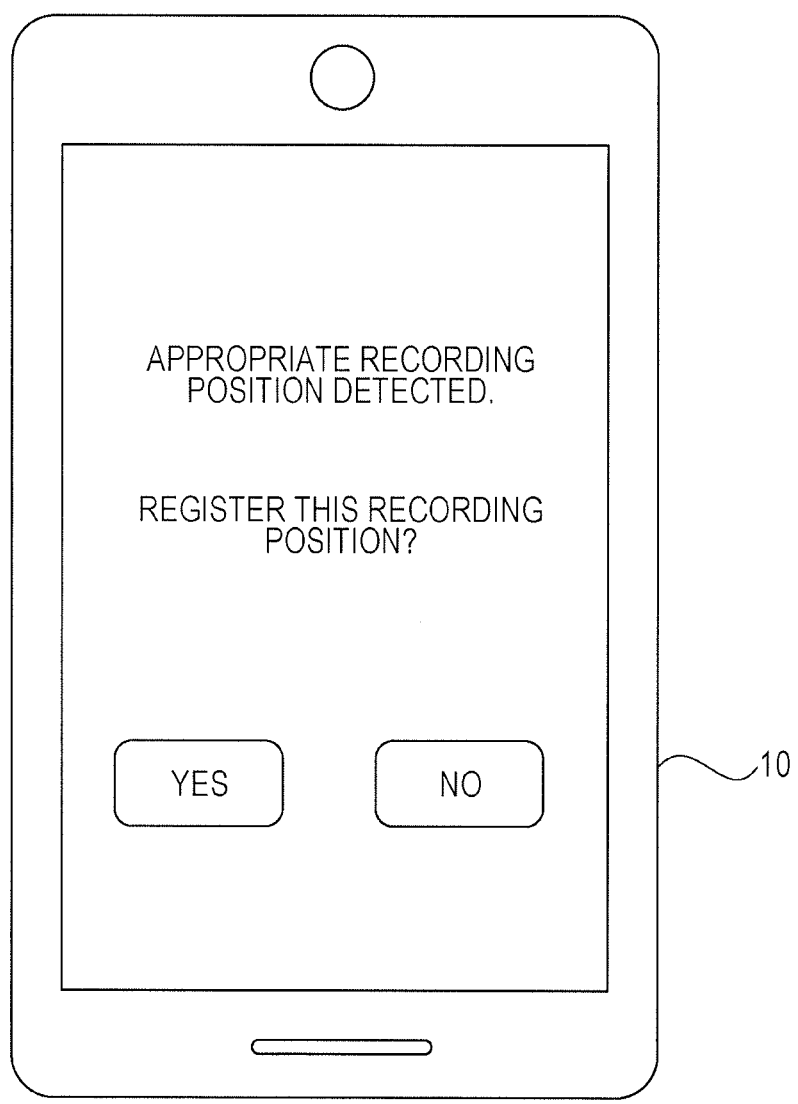
FIG. 12 is an example display screen when asking a user to confirm whether or not to register appropriate position information.

Additionally, after the appropriate position is decided and the appropriate position information is created, a display is presented as illustrated in FIG. 12, for example, to confirm with the user whether or not to register the appropriate position information (step S305).

At this point, if the user chooses to register the appropriate position information, the created appropriate position information is transmitted to the server device 50, together with the model information of the noise diagnostic device 10 and the model information of the image forming device 20 (step S306). Subsequently, in the server device 50, the transmitted appropriate position information is stored, together with the model information of the noise diagnostic device 10 and the model information of the image forming device 20.

Figure 13:
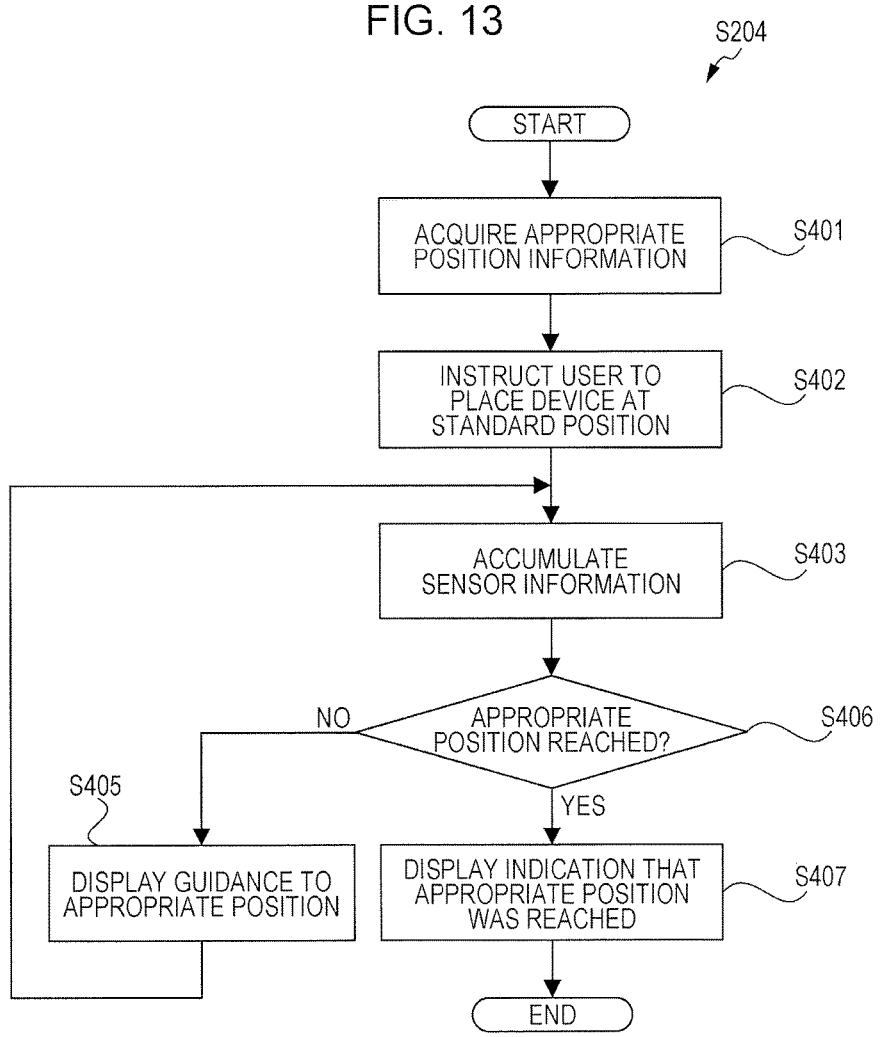
FIG. 13 is a flowchart for explaining details of a guidance display process (step S204) for guidance to an appropriate position illustrated in the flowchart of FIG. 8.

Next, the process of displaying guidance to the appropriate position (step S204) illustrated in the flowchart of FIG. 8 will be described in detail with reference to the flowchart in FIG. 13.

In the noise diagnostic device 10, to guide the noise diagnostic device 10 to the appropriate position and record the noise signal, appropriate position information corresponding to the combination of the models of the noise diagnostic device 10 and the image forming device 20 is acquired from the server device 50 (step S401).

Subsequently, the controller 33 of the noise diagnostic device 10 causes the display 35 to display a screen like that illustrated in FIG. 10, and instructs the user to place the noise diagnostic device 10 at the standard position (step S402).

Additionally, the displacement measurement unit 38 and the orientation change measurement unit 39 accumulate sensor information from the acceleration sensor 18 and the gyro sensor 19, and measure the displacement from the standard position and the change in orientation from the standard state, respectively (step S403).

At this point, the controller 33 monitors whether or not the noise diagnostic device 10 has reached the appropriate position according to whether or not the displacement from the standard position measured by the displacement measurement unit 38 and the change in orientation from the standard state measured by the orientation change measurement unit 39 match the acquired appropriate position information (step S406).

Subsequently, in the case of determining that the noise diagnostic device 10 has not reached the appropriate position (step S406, no), the controller 33 causes the display 35 to display guidance for leading the noise diagnostic device 10 to the appropriate position (step S405).

Specific examples of such a guidance display will be described with reference to FIGS. 14 to 18.

Figure 14:
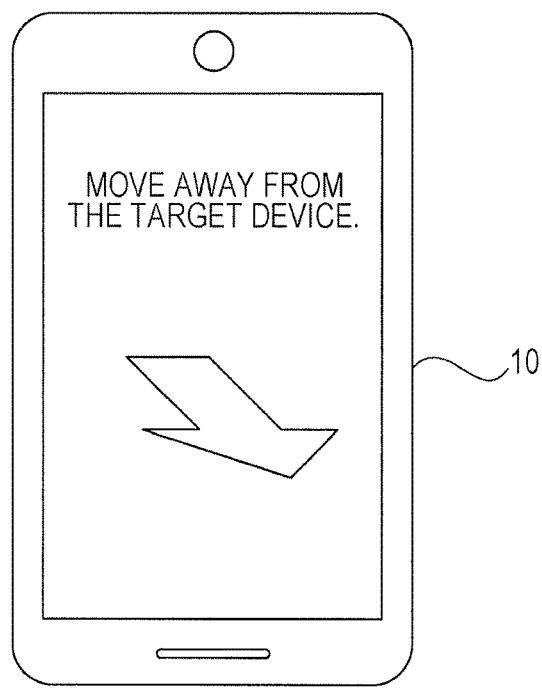
FIG. 14 is an example of a guidance instruction for moving a noise diagnostic device 10 in a direction away from a device to be analyzed, namely an image forming device 20.
Figure 15:
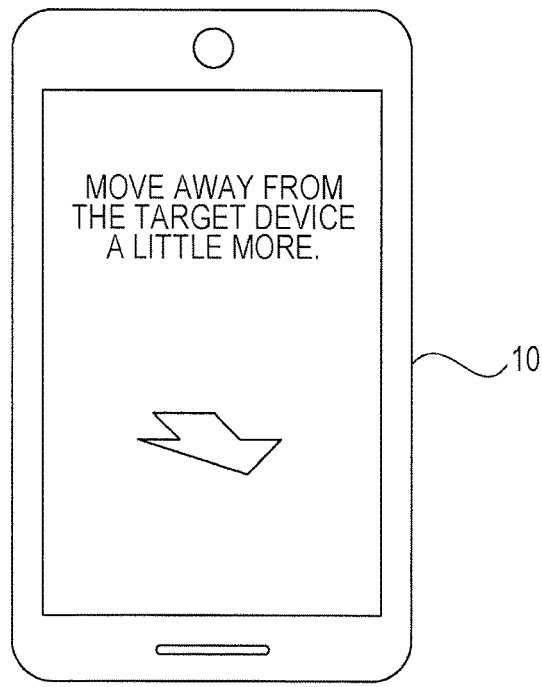
FIG. 15 is an example of a guidance instruction for moving a noise diagnostic device 10 in a direction away from a device to be analyzed, namely an image forming device 20.

FIGS. 14 and 15 are both examples of a guidance instruction for moving the noise diagnostic device 10 in a direction away from the device to be analyzed, namely the image forming device 20. Herein, the controller 33 changes the display content according to the remaining distance between the current position of the noise diagnostic device 10 and the appropriate position. When the remaining distance is large, as illustrated in FIG. 14, the message "Move away from the target device." and a large arrow are displayed, indicating that there is still some distance to the appropriate position.

On the other hand, when the remaining distance is small, as illustrated in FIG. 15, the message "Move away from the target device a little more." and a small arrow are displayed, indicating that the remaining distance to the appropriate position is slight.

By changing the display content according to the remaining distance in this way, the user who moves the noise diagnostic device 10 while looking at the display is able to grasp the remaining distance intuitively.

Figure 16:
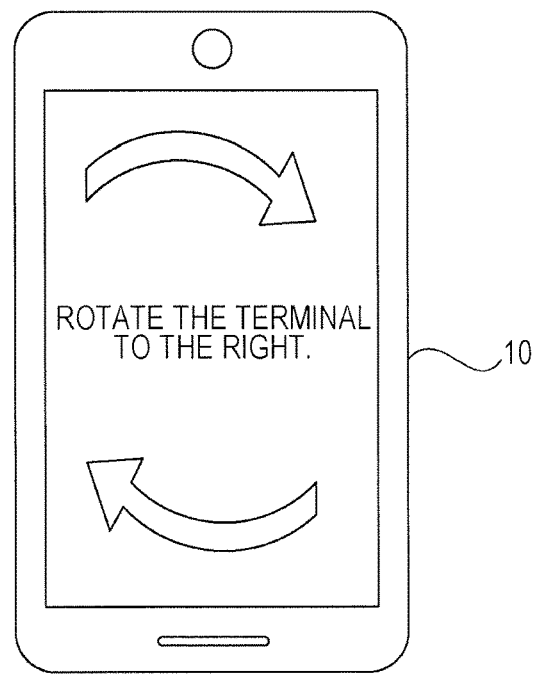
FIG. 16 is an example of a guidance display for rotating a noise diagnostic device 10 to the right in the horizontal direction.
Figure 17:
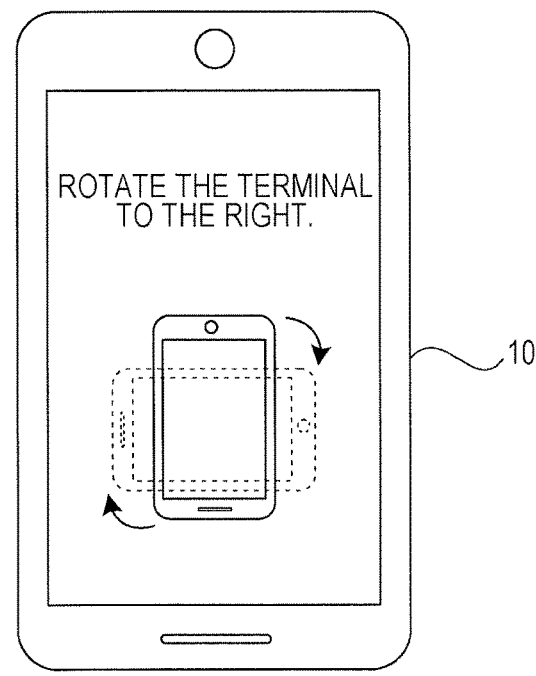
FIG. 17 is an example of a guidance display for rotating a noise diagnostic device 10 to the right in the horizontal direction.

In addition, FIGS. 16 and 17 are both examples of a guidance display for rotating the noise diagnostic device 10 to the right in the horizontal direction. FIG. 16 is an example of the case of instructing the user to rotate to the right using only text and arrows, whereas FIG. 17 is an example of the case of instructing the user to rotate the noise diagnostic device 10 to the right by displaying text and an exterior view of the noise diagnostic device 10.

Figure 18:
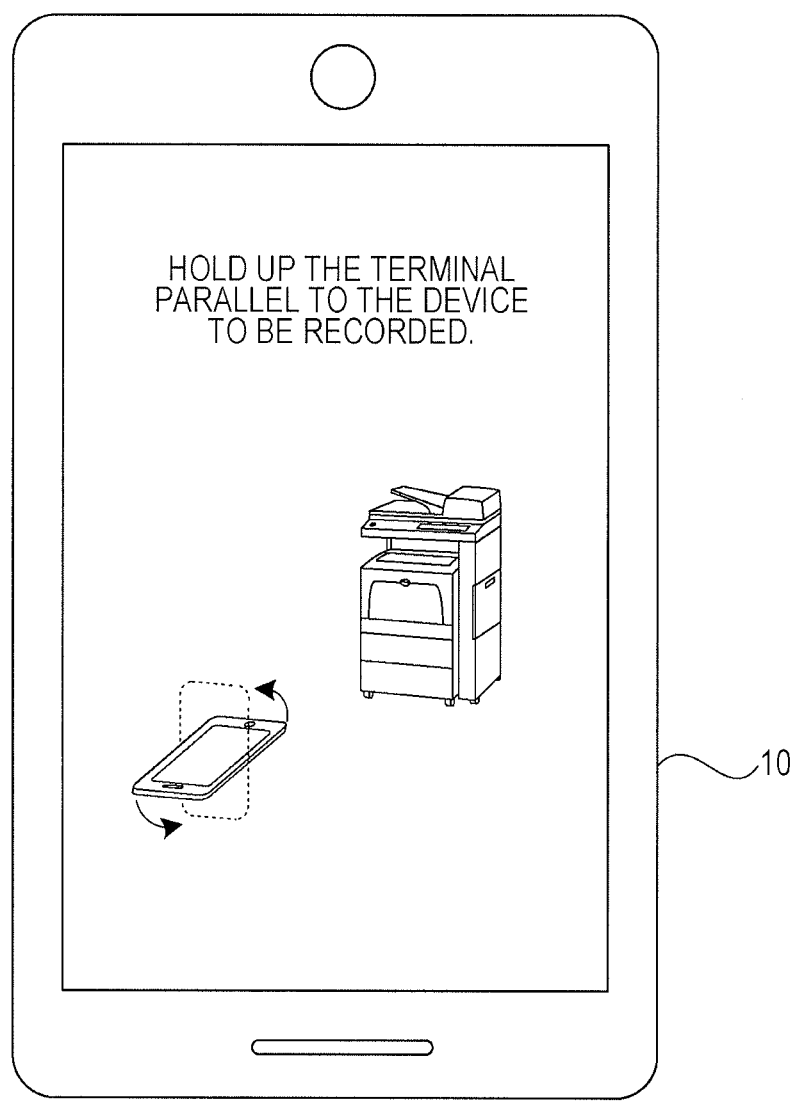
FIG. 18 is an example of a guidance display for rotating a noise diagnostic device 10 in the vertical direction.

Also, FIG. 18 is an example of a guidance display for rotating the noise diagnostic device 10 in the vertical direction. FIG. 18, similarly to FIG. 17, is a case of instructing the user to rotate the noise diagnostic device 10 by displaying text and an exterior view of the noise diagnostic device 10.

Figure 19:
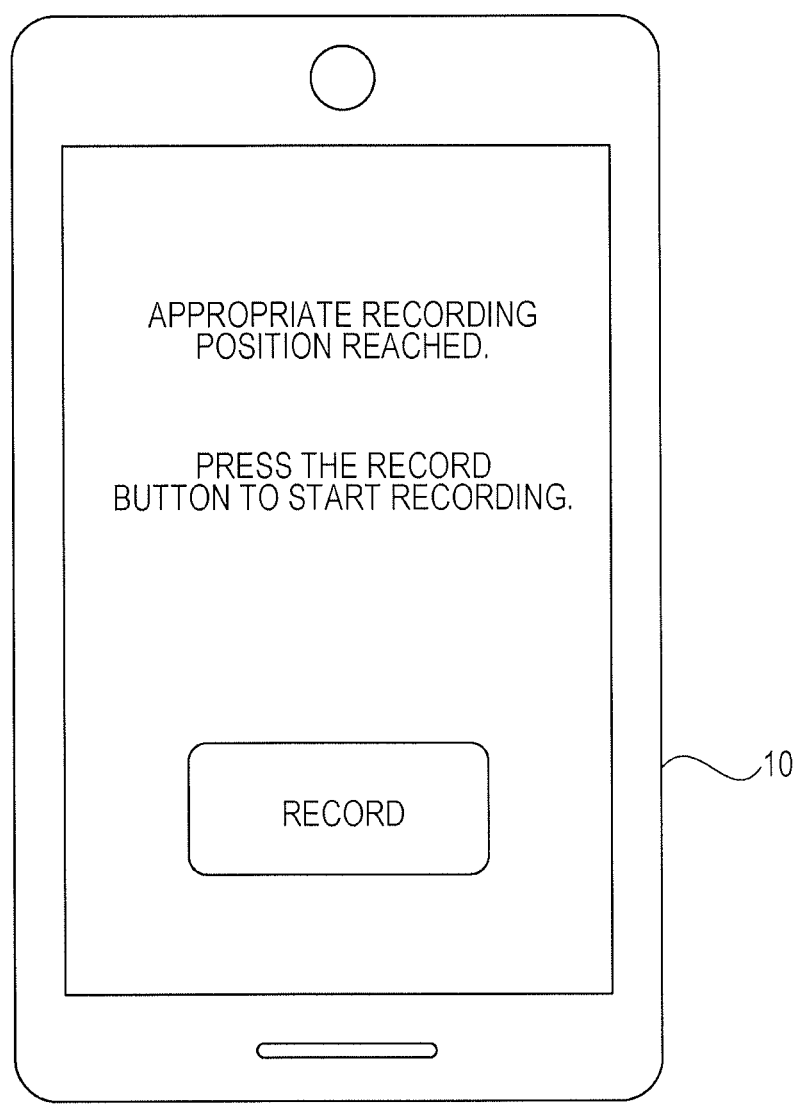
FIG. 19 is an example display screen for indicating to a user that a noise diagnostic device 10 has reached an appropriate position.

Subsequently, in the case of determining that the noise diagnostic device 10 has reached the appropriate position (step S406, yes), the controller 33 causes the display 35 to display a screen as illustrated in FIG. 19 indicating that the noise diagnostic device 10 has reached the appropriate position (step S407).

On the screen display illustrated in FIG. 19, an indication that the noise diagnostic device 10 has reached the appropriate position is presented, and in addition, a "Record" button is displayed to demonstrate that the recording of noise is now available. In other words, by not displaying the "Record" button until the appropriate position is reached, the user is unable to start recording noise before the appropriate position is reached.

Note that in another possible configuration, an instruction for starting recording may be executed before the noise diagnostic device 10 reaches the appropriate position, so that when the appropriate position is reached, the recording of noise is started automatically.

Furthermore, when the noise diagnostic device 10 reaches the appropriate position, a specific sound may be output by the audio output unit 37 or a vibration element may be made to vibrate to inform the user that the appropriate position has been reached.

Subsequently, after the noise diagnostic device 10 reaches the appropriate position by conducting a process as discussed above, the operating mode is set to a recording mode and the microphone 17 is directed towards the image forming device 20 to record the noise and acquire sound data (step S103).

Next, in the noise diagnostic device 10, the frequency analyzer 32 applies the STFT to the acquired sound data to thereby generate a frequency spectrum waveform expressing the change over time in the signal intensity distribution at each frequency (step S104).

Figure 20:
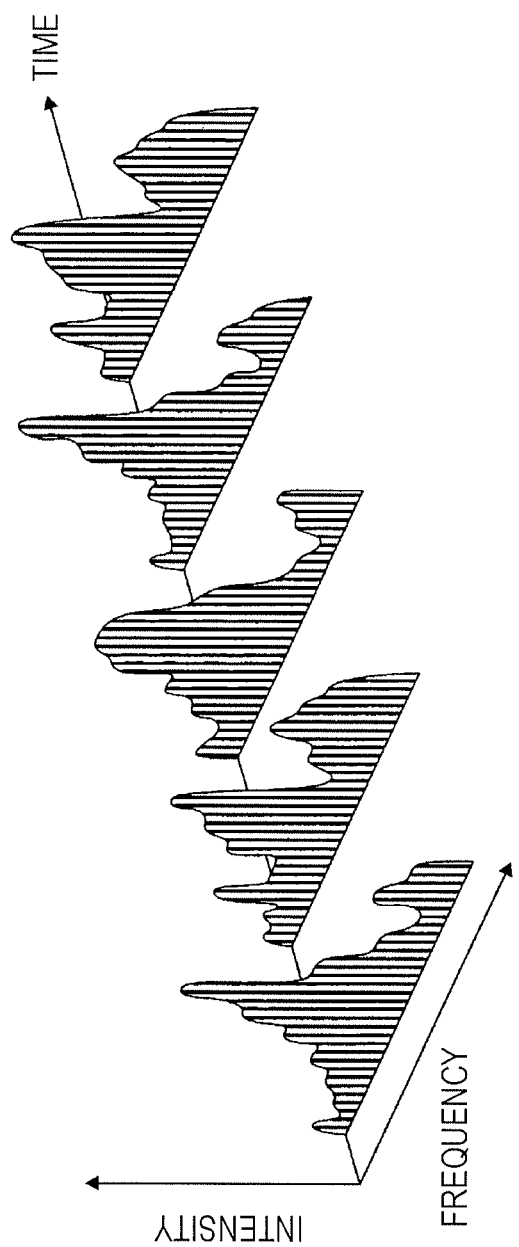
FIG. 20 is a diagram for explaining the concept of the STFT.

As illustrated in FIG. 20, the STFT performs a Fourier transform over short time intervals to compute the signal intensity for each frequency component according to the change over time. Additionally, FIG. 21 illustrates an example waveform in the case of presenting the analysis result obtained by the STFT as a single image of the frequency spectrum waveform.

Figure 21:
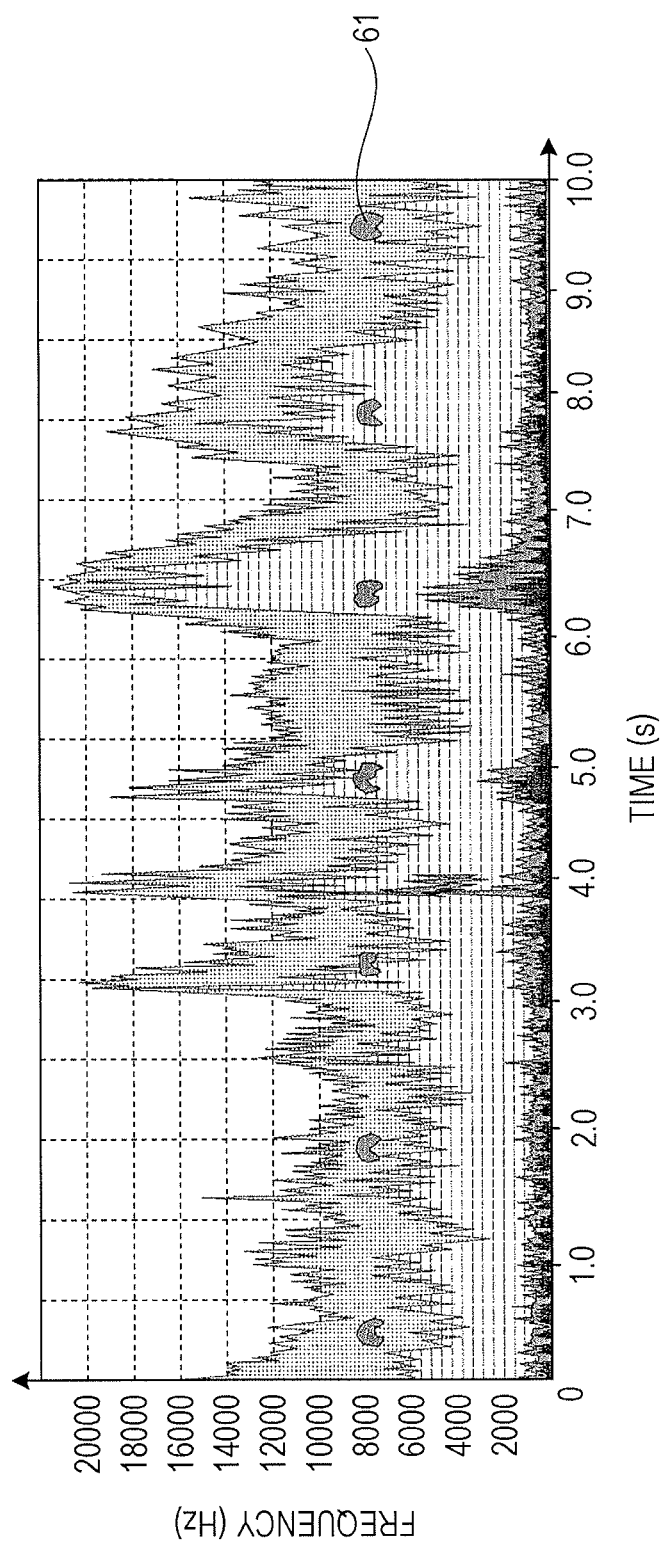
FIG. 21 is a diagram illustrating an example image of a frequency spectrum waveform based on an analysis result obtained by the STFT.

In the example frequency spectrum waveform illustrated in FIG. 21, the horizontal axis represents time, the vertical axis represents frequency, and the intensity at each frequency is expressed according to color. Note that in FIG. 21, differences of color are expressed by hatching patterns. Also, although FIG. 21 illustrates an example of a case in which the intensity at each frequency is expressed according to color, the intensity may also be expressed according to tone.

The example frequency spectrum waveform in FIG. 21 demonstrates a display indicating that a noise frequency component 61 is produced periodically at specific frequencies. Note that in the example frequency spectrum waveform illustrated in FIG. 21, the low-frequency components are ordinary operating sounds, and not noise frequency components.

Figure 22:
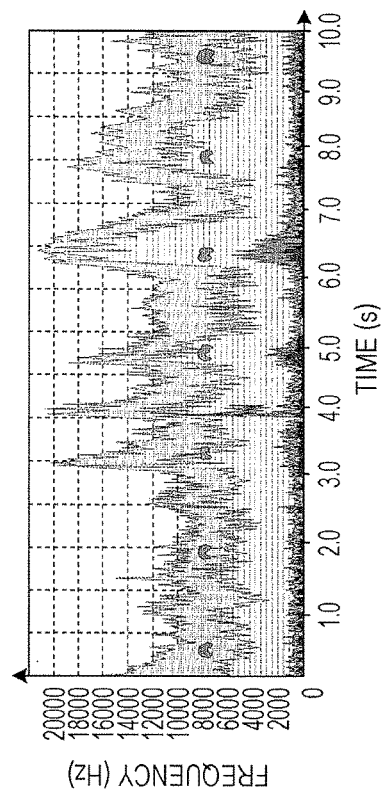
FIG. 22 is a diagram illustrating an example of a case of presenting a display prompting the user to specify a region estimated to be noise when presenting the user with a frequency spectrum waveform.

After a frequency spectrum waveform as illustrated in FIG. 21 is obtained, the controller 33 displays the frequency spectrum waveform on the display 35. Subsequently, as illustrated in FIG. 22, the controller 33 presents a display prompting the user to specify a region estimated to be noise on the displayed frequency spectrum waveform. The example illustrated in FIG. 22 demonstrates that the text "Specify the region of apparent noise." is displayed to prompt the user to specify a region estimated to be noise.

Subsequently, by referring to such a display, the user presented with the frequency spectrum waveform identifies the noise frequency component 61, and selects a region including the noise frequency component 61 by operating the touch panel, for example.

Figure 23:
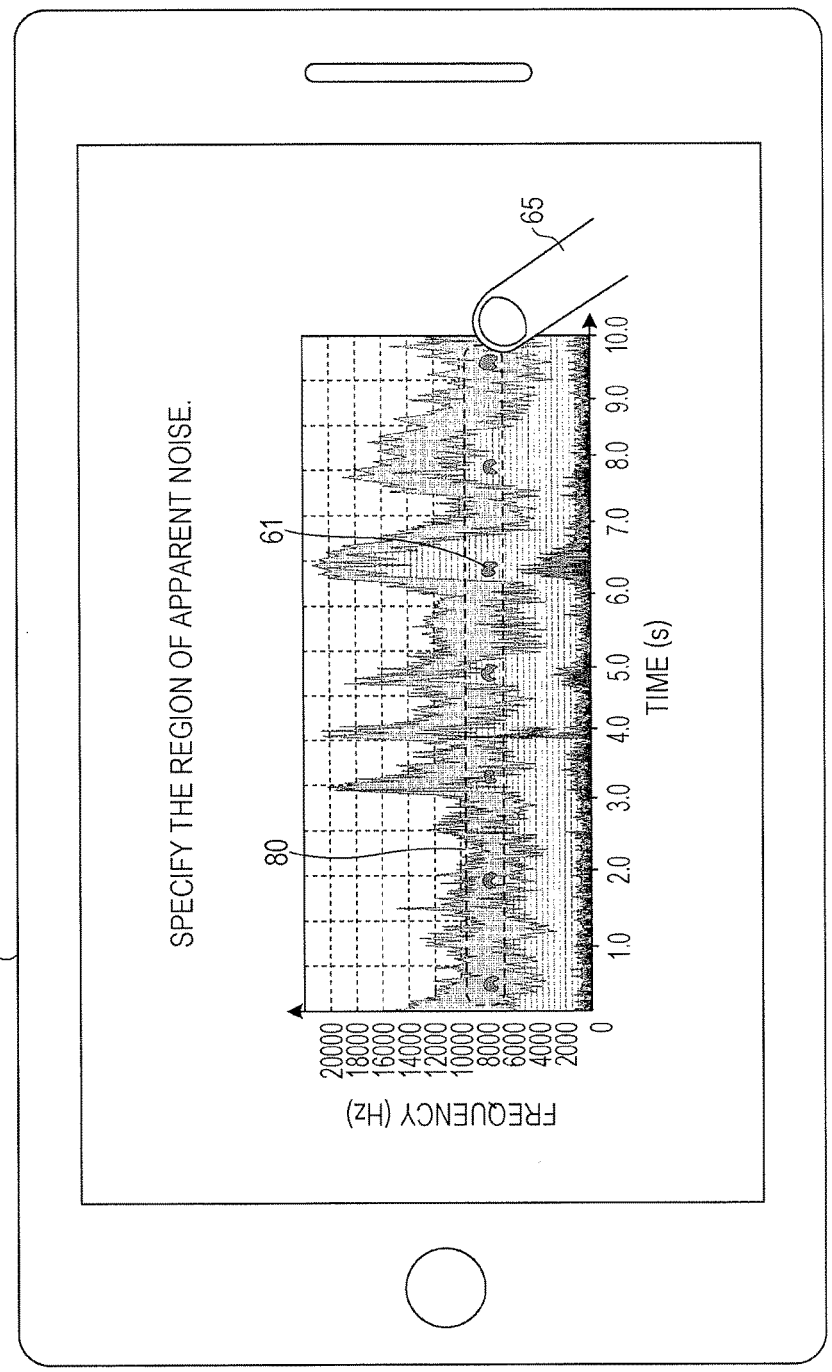
FIG. 23 is a diagram illustrating an example of a selected region 80 selected by the user in the example image of a frequency spectrum waveform in FIG. 22.

FIG. 23 illustrates an example of a selected region 80 selected by the user in this way. The example illustrated in FIG. 23 demonstrates that the user operates the touch panel with his or her finger 65 to thereby specify a rectangular region including multiple noise frequency components 61 as the selected region 80.

Figure 24:
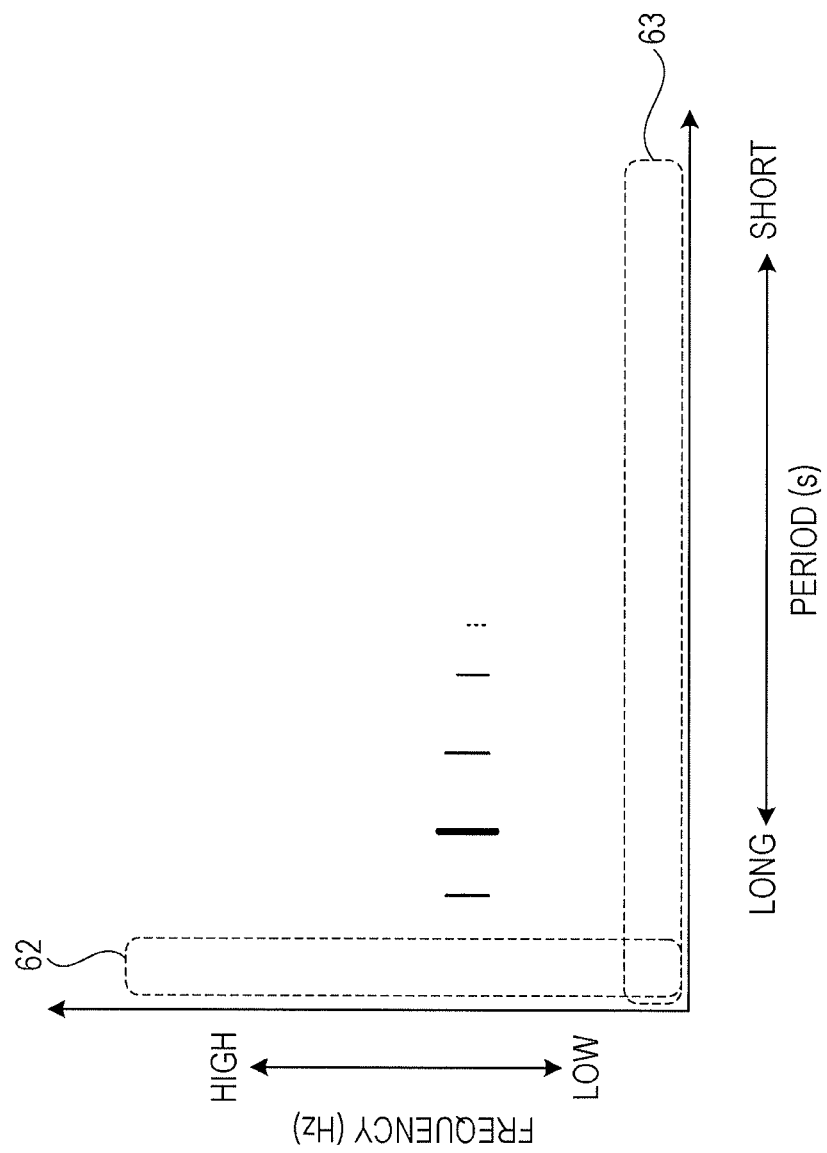
FIG. 24 is a diagram illustrating an example of a fast Fourier transform analysis result.

Subsequently, after the selected region 80 is specified in this way, the frequency analyzer 32 executes a fast Fourier transform (1D-FFT) on the frequency components included in the selected region 80 (step S105). FIG. 24 illustrates an example of an analysis result of the fast Fourier transform executed in this way.

Note that in FIG. 24, the period and the frequency of the noise is identified by detecting the period and the frequency of the signal of the frequency components on which the fast Fourier transform was performed. Note that since the noise also includes harmonic components and the like, multiple periods may be detected in some cases, but the period with the strongest signal intensity is detected as the noise period.

Also, since signal components having a long period equal to or greater than a certain period may be considered to be ordinary operating sounds or aperiodic noise, the region of signal components having such a long period is treated as an excluded region 62, and analysis results in the excluded region 62 are ignored.

Furthermore, since signal components of low frequency less than or equal to a certain frequency may be indistinguishable from ordinary operating sounds, the region of signal components having such a low frequency is treated as an excluded region 63, and analysis results in the excluded region 63 are ignored.

In the noise diagnostic device 10, from the analysis result of the fast Fourier transform, information about the frequency and the period of the noise is transmitted together with information about the operating status to the server device 50 (step S106). For example, information indicating a noise frequency of 4 kHz and a noise period of 2.0 s is transmitted to the server device 50.

Subsequently, in the server device 50, the waveform data storage 53 is searched on the basis of the received information, and frequency spectrum waveform data corresponding to the received information is extracted (step S107).

Subsequently, the server device 50 transmits the extracted frequency spectrum waveform data, together with information such as the original sound data, the cause of the noise, and the treatment to address the noise, to the noise diagnostic device 10 (step S108).

After that, the noise diagnostic device 10 receives the frequency spectrum waveform data transmitted from the server device 50 (step S109). Subsequently, the controller 33 of the noise diagnostic device 10 causes the display 35 to display the received frequency spectrum waveform and the frequency spectrum waveform obtained by the SIFT (step S110).

Figure 25:
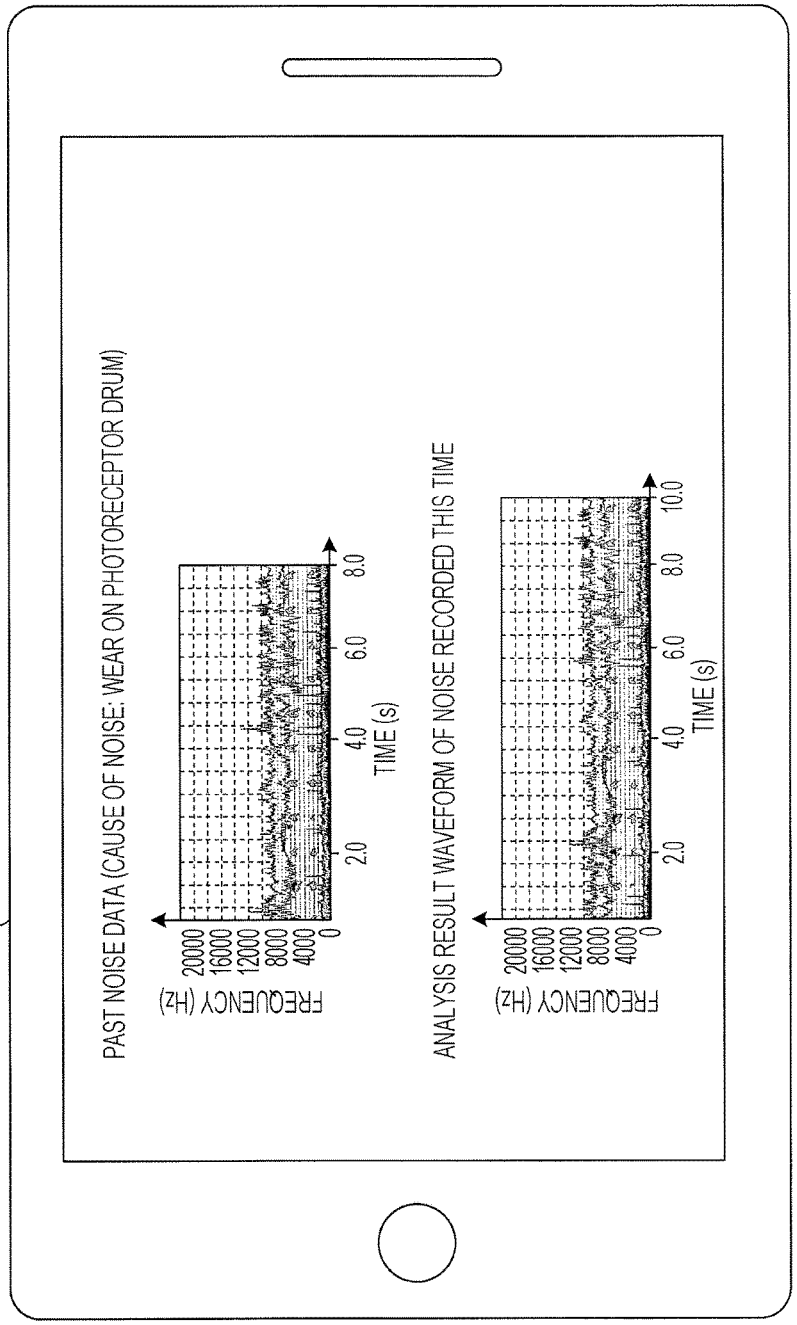
FIG. 25 is a diagram illustrating an example screen of a noise diagnostic device 10 on which two frequency spectrum waveforms are displayed.

FIG. 25 illustrates an example screen on the noise diagnostic device 10 displaying two frequency spectrum waveforms in this way.

The example screen illustrated in FIG. 25 demonstrates that the frequency spectrum waveform obtained by the SIFT in the frequency analyzer 32 is displayed as the "Analysis result waveform of noise recorded this time", while the frequency spectrum waveform transmitted from the server device 50 is displayed as "Past noise data" together with the cause of the noise, "wear on photoreceptor drum".

The serviceman attempting to perform a noise diagnosis compares these two frequency spectrum waveforms, and identifies the cause of the noise by determining whether or not the noise components in the waveforms resemble each other.

Figure 26:
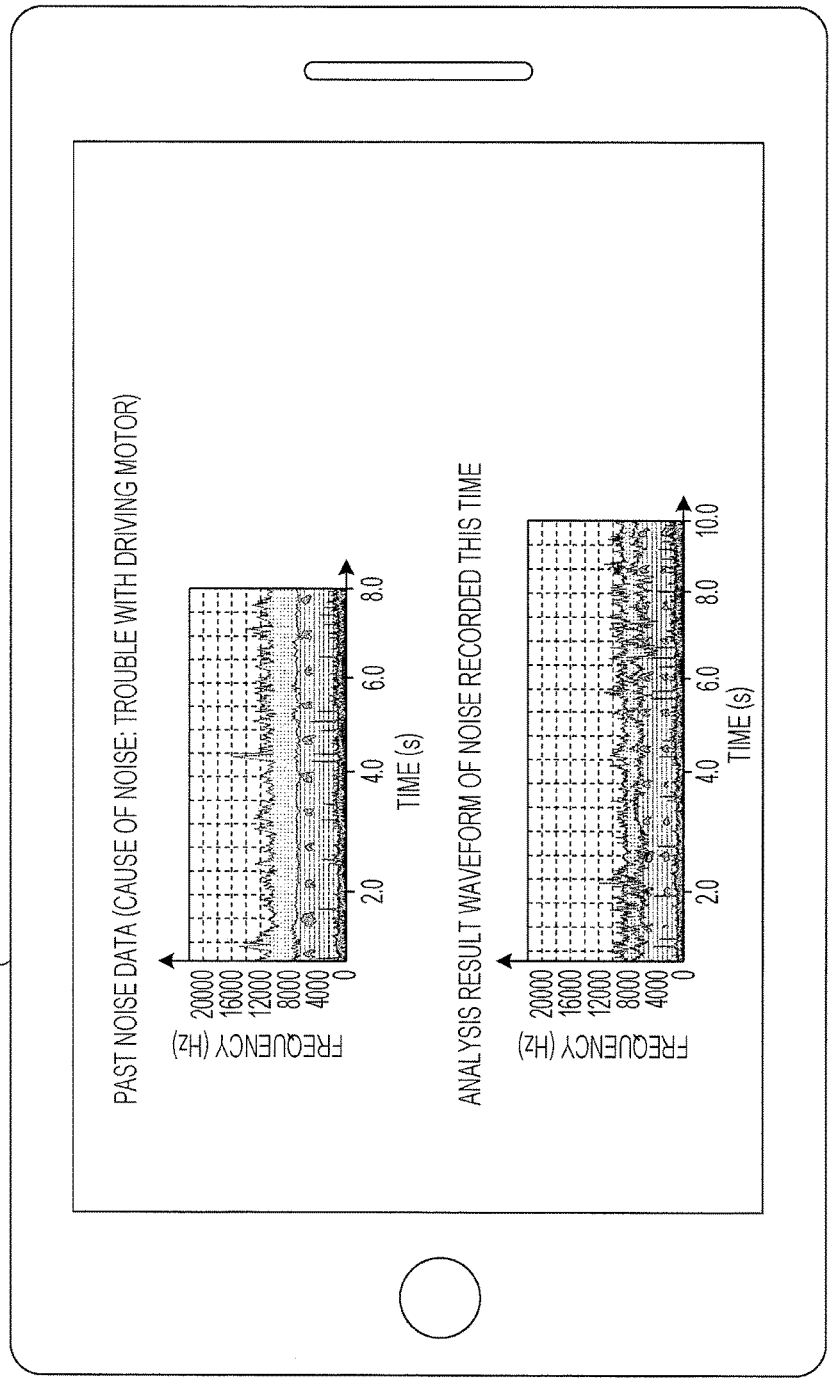
FIG. 26 is a diagram illustrating an example image for a case in which separate frequency spectrum waveforms with a different cause of noise are displayed compared to the example screen illustrated in FIG. 25.

Also, when multiple frequency spectrum waveforms are transmitted from the server device 50, a different frequency spectrum waveform like in FIG. 26 is displayed by performing a touch operation in the horizontal direction on the image of the frequency spectrum waveform being displayed as the "Past noise data", for example.

FIG. 26 illustrates an example image displaying a frequency spectrum waveform of noise for which the cause of the noise is "trouble with driving motor".

When multiple frequency spectrum waveforms are transmitted in this way, the cause of the noise is identified by determining which of the frequency spectrum waveforms resembles the frequency spectrum waveform of the noise recorded this time. Note that when identifying the cause of the noise, the cause of the noise is identified not only by simply comparing features such as the shape of the frequency spectrum waveform or the period and the frequency of the noise components, but also by listening and comparing the noise acquired this time to the noise corresponding to the frequency spectrum waveform transmitted from the server device 50.

Figure 27:
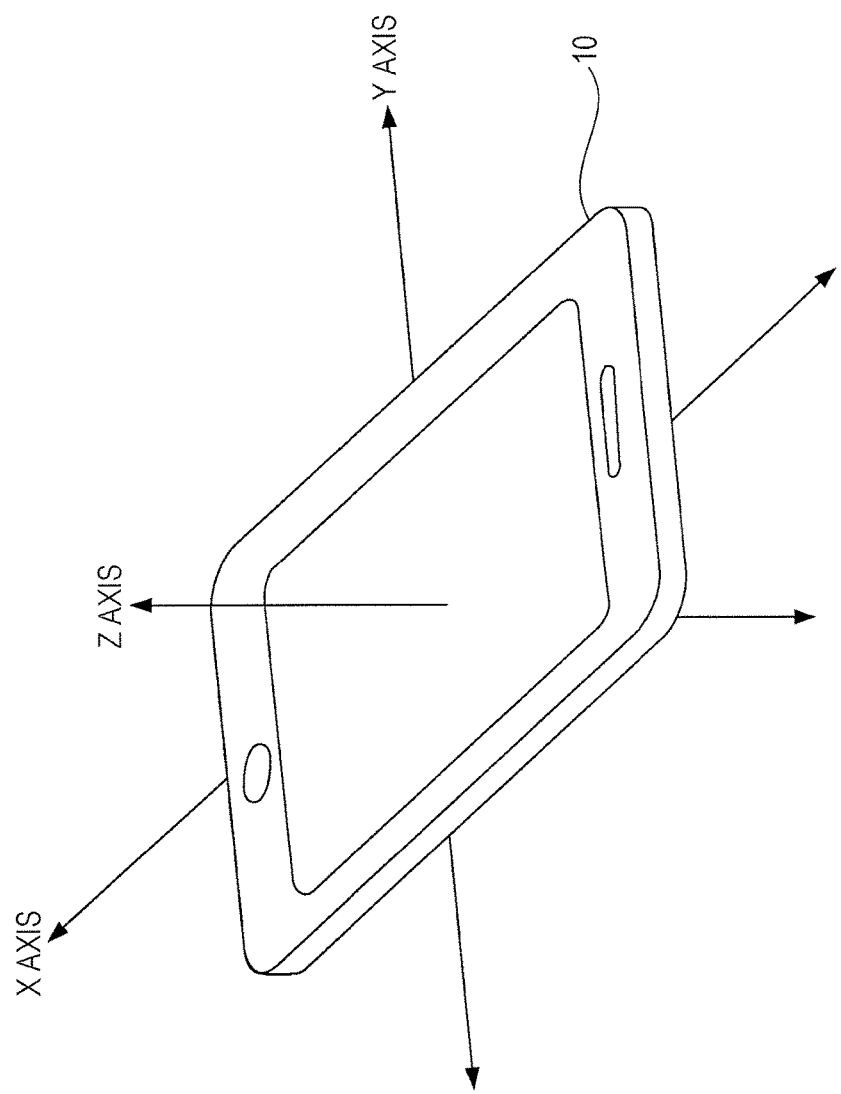
FIG. 27 is a diagram for explaining how a 3-axis acceleration sensor is used to detect acceleration in three axis directions of a noise diagnostic device 10.

Note that although the present exemplary embodiment is described using the case of the noise diagnostic device 10 measuring the displacement in the direction away from the image forming device 20 by using an acceleration sensor, the present invention is not limited to the case of measuring such displacement. For example, by using a 3-axis acceleration sensor inside the noise diagnostic device 10, and detecting the acceleration in the three axis direction of the noise diagnostic device 10, as illustrated in FIG. 27, it is possible to measure the displacement not only in the direction away from the image forming device 20, but also the horizontal direction and the vertical direction.

Furthermore, the present invention is not limited to the case of measuring the displacement using an acceleration sensor, and in the case in which consumables such as the photoreceptor drum and toner cartridges are provided with wireless IC tags that perform short-range wireless communication, the noise diagnostic device 10 may be provided with a communication unit that communicates with such wireless IC tags, thereby enabling the relative distance between the image forming device 20 and the noise diagnostic device 10 to be measured from the strength of the reflected wave returning from the wireless IC tags.

EXEMPLARY MODIFICATIONS

The foregoing exemplary embodiment is described using a case in which the noise diagnostic device 10 is a tablet, but an exemplary embodiment of the present invention is not limited thereto, and the present invention may also be applied when using another device as the noise diagnostic device. For example, if the operating panel of the image forming device 20 is configured to be removable from the image forming device 20, is able to communicate with the server device 50, and includes a built-in sound signal acquisition function, the operating panel may also be treated as the noise diagnostic device.

Also, the foregoing exemplary embodiment is described using a case in which the device targeted for noise analysis is an image forming device, but the device targeted for noise analysis is not limited to being an image forming device, and the present invention is similarly applicable even in the case of another device, insofar as the device may possibly produce noise of a periodic nature.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A diagnostic device comprising:
   a microphone that captures a produced sound;
   an acquisition unit that receives the produced sound from the microphone as input and acquires sound information;
   a first measurement unit that measures a distance from a standard position;
   a second measurement unit that measures a change in orientation from a standard state; and
   a controller that acts as:
      a generation unit that generates appropriate position information, the appropriate position information being the distance from the standard position to the diagnostic device measured by the first measurement unit, and the change in orientation from the standard state measured by the second measurement unit; and
      a guidance unit that uses the appropriate position information to guide the diagnostic device to an appropriate position when acquiring the sound information, wherein
   the first measurement unit is configured to measure the distance from the standard position by taking a double integral of acceleration information.

2. The diagnostic device according to claim 1, further comprising:
   a display unit that displays an analysis result obtained by performing a frequency analysis on sound information acquired by the acquisition unit after the guidance unit guides the diagnostic device to the appropriate position.

3. The diagnostic device according to claim 1, wherein the appropriate position information is information related to a position where a magnitude of sound lies within a predetermined range when acquiring sound information with the acquisition unit.

4. The diagnostic device according to claim 1, wherein the guidance unit provides guidance after issuing an instruction to place the diagnostic device in the standard state at the standard position with respect to a target device.

5. The diagnostic device according to claim 2, wherein
the controller is further configured to act as a frequency analysis unit that performs time-frequency analysis on the sound information acquired by the acquisition unit, and generates an analysis result expressing change over time in an intensity distribution at each frequency, and
the diagnostic device further comprises:
a transmission unit that transmits, to an external device, information obtained from the analysis result generated by the frequency analysis unit and device information related to a device to be measured; and
a reception unit that receives, from the external device, an analysis result corresponding to the analysis result, wherein
the display unit displays the analysis result generated by the frequency analysis unit and the analysis result received by the reception unit.

6. The diagnostic device according to claim 1, wherein the acquisition unit does not start the acquisition of sound information until the guidance unit finishes guiding the diagnostic device to the appropriate position.

7. The diagnostic device according to claim 1, wherein the guidance unit guides the diagnostic device to the appropriate position by displaying guidance for leading the diagnostic device to the appropriate position.

8. The diagnostic device according to claim 1, wherein the guidance unit guides the diagnostic device to the appropriate position by outputting guidance as audio for leading the diagnostic device to the appropriate position.

9. The diagnostic device according to claim 7, wherein the guidance unit varies content of the displayed guidance according to a distance from a current position of the diagnostic device to the appropriate position.

10. The diagnostic device according to claim 7, wherein the guidance unit guides the diagnostic device to the appropriate position by displaying an exterior view of the diagnostic device and indicating a direction in which to change orientation.

11. The diagnostic device according to claim 1, wherein the first measurement unit measures displacement from the standard position using acceleration information from an acceleration sensor.

12. The diagnostic device according to claim 1, wherein the second measurement unit measures change in orientation from the standard state using detection information from an angular velocity sensor or a geomagnetic sensor.

13. A diagnostic system comprising:
a microphone that captures a produced sound;
an acquisition unit that receives the produced sound from the microphone as input and acquires sound information;
a first measurement unit that measures a distance from a standard position;
a second measurement unit that measures a change in orientation from a standard state;
a controller configured to act as:
a generation unit that generates appropriate position information, the appropriate position information being the distance from the standard position to a local device measured by the first measurement unit, and the change in orientation from the standard state measured by the second measurement unit;
a guidance unit that uses the appropriate position information to guide the local device to an appropriate position when acquiring the sound information; and
a frequency analysis unit that, by performing time-frequency analysis on the sound information acquired by the acquisition unit, generates an analysis result expressing change over time in an intensity distribution at each frequency;
a storage unit that stores a plurality of analysis results obtained by performing frequency analysis on a sound signal of noise;
the controller is further configured to acts as a selection unit that uses information obtained from the analysis result generated by the frequency analysis unit and device information related to a target device to select, from among the plurality of analysis results stored in the storage unit, an analysis result corresponding to the analysis result generated by the frequency analysis unit; and
a display unit that displays the analysis result generated by the frequency analysis unit and the analysis result selected by the selection unit, wherein
the first measurement unit is configured to measure the distance from the standard position by taking a double integral of acceleration information.

14. A diagnostic method comprising:
capturing a produced sound with a microphone;
providing the produced sound to an acquisition unit as input;
measuring a distance from a standard position and measuring a change in orientation from a standard state;
generating appropriate position information, the appropriate position information being the measured distance from the standard position to a local device and the measured change in orientation from the standard state; and
using the appropriate position information to guide the local device to an appropriate position when acquiring the sound information, wherein
the distance from the standard position is measured by taking a double integral of acceleration information.

15. A non-transitory computer-readable medium storing a program causing a computer to execute a diagnostic process, the diagnostic process comprising:
capturing a produced sound with a microphone;
providing the produced sound to an acquisition unit as input;
measuring a distance from a standard position and measuring a change in orientation from a standard state;
generating appropriate position information, the appropriate position information being the measured distance from the standard position to a local device and the measured change in orientation from the standard state; and
using the appropriate position information to guide the local device to an appropriate position when acquiring the sound information, wherein
the distance from the standard position is measured by taking a double integral of acceleration information.

* * * * *